US006230118B1

(12) United States Patent
Bader et al.

(10) Patent No.: US 6,230,118 B1
(45) Date of Patent: *May 8, 2001

(54) DOS BASED APPLICATION SUPPORTS FOR A CONTROLLERLESS MODEM

(75) Inventors: James E. Bader; Scott Deans, both of Raleigh; Richard P. Tarquini, Apex, all of NC (US)

(73) Assignee: Cirrus Logic, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,800

(22) Filed: Jun. 30, 1997

(51) Int. Cl.[7] .................................................... G06F 9/455
(52) U.S. Cl. ................................ 703/24; 703/25; 703/26; 703/27; 710/5; 710/100
(58) Field of Search .................................... 395/500, 823; 703/23, 24, 25, 26, 27; 710/5, 100

(56) References Cited

U.S. PATENT DOCUMENTS

| 3,497,822 | 2/1970 | Beurrier | 330/296 |
|---|---|---|---|
| 3,500,222 | 3/1970 | Kozawa et al. | 330/284 |
| 3,849,677 | 11/1974 | Stacey et al. | 327/552 |
| 4,344,188 | 8/1982 | Tanabe et al. | 455/326 |

(List continued on next page.)

FOREIGN PATENT DOCUMENTS

| 3329664 A1 | 3/1985 | (DE) . |
| 0463857 A1 | 1/1992 | (EP) . |
| 0498221 A1 | 8/1992 | (EP) . |

(List continued on next page.)

OTHER PUBLICATIONS

R.L. Gwinn, "VMODEM Technical Reference Manual", Aug. 15, 1996, pp. 1–19, XP–002064677, web http://www.gwinn.com.
European Search Report, Dec. 18, 1995.
Paul R. Gray and Robert G. Meyer, "Analysis and Design of Analog Integrated Circuits," New York, 1977, pp. 236–239, pp. 254–261, pp. 561–575.
Alan B. Grebene, "Bipolar and MOS Analog Integrated Circuit Designs," New York, 1984, pp. 415–417.
Wes Hayward and Doug Demaw, "Solid State Design for the Radio Amateur," Newington, Ct., 1986, pp. 7–16, pp. 111–115.
Japan Patent Abstracts, vol. 8, No. 194 (E264), Japan (JP–A–59 081906), May 11, 1984.
David K. Lovelace, "Silicon MOSFETs Power Gilbert–Cell Mixers," *Microwaves & Rf*, Apr. 1993, pp. 59–60.
Optimax, Inc., Triax Catalogue, "RF Microwave Attenuators . . . ," Hatfield, PA., pp. 3–224 to 3–227.
Watkins–Johnson Company, *RF and Microwave Components Designer's Handbook*, 1990, pp. 357–366, pp. 689–702.

*Primary Examiner*—Kevin J. Teska
*Assistant Examiner*—Samuel Broda
(74) *Attorney, Agent, or Firm*—J. P. Violette; Peter Rutkowski; David L. Stewart

(57) ABSTRACT

DOS application programs are accommodated when using a controllerless modem by providing a virtual device driver. The virtual device driver emulates UART to UART communications and handles interrupts by the DOS applications and by a hardware port managed by the controllerless modem. In one implementation, the virtual device driver shares a communications interface in common with 32-bit applications. In a communication system environment, DOS applications can participate in modem to modem communications with remote DTEs and with other devices using the services of the virtual device driver.

18 Claims, 22 Drawing Sheets

U.S. PATENT DOCUMENTS

| | | | |
|---|---|---|---|
| 4,419,632 | 12/1983 | Morris | 330/277 |
| 4,480,337 | 10/1984 | Graziadei et al. | 455/333 |
| 5,038,365 * | 8/1991 | Belloc et al. | 375/8 |
| 5,105,165 | 4/1992 | Bien | 330/149 |
| 5,150,076 | 9/1992 | Asazawa | 330/296 |
| 5,166,645 | 11/1992 | Watts | 331/37 |
| 5,252,866 | 10/1993 | Kimura | 455/333 |
| 5,268,649 | 12/1993 | Jones | 330/396 |
| 5,323,123 | 6/1994 | Philippe | 330/277 |
| 5,352,992 | 10/1994 | Asazawa | 330/210 |
| 5,357,089 | 10/1994 | Prentice | 330/298 |
| 5,379,457 | 1/1995 | Nguyen | 455/323 |
| 5,422,522 | 6/1995 | Rotay | 327/512 |
| 5,604,870 * | 2/1997 | Moss et al. | 395/280 |
| 5,628,030 | 5/1997 | Tuckner | 710/64 |
| 5,787,305 * | 7/1998 | Chen | 395/823 |
| 5,864,710 * | 1/1999 | Sands et al. | 395/825 |

FOREIGN PATENT DOCUMENTS

| | | |
|---|---|---|
| 0 740 253 A2 | 10/1996 | (EP) . |
| 0 788 057 A1 | 8/1997 | (EP) . |
| 2243965 | 11/1991 | (GB) . |
| 53-39811 | 4/1978 | (JP) . |
| 59-22406 | 2/1984 | (JP) . |
| 4253409 | 9/1992 | (JP) . |
| 8503435 | 7/1987 | (NL) . |
| 1517116 | 10/1989 | (SU) . |

\* cited by examiner

| DLAB | ADDRESS OFFSET | READ / WRITE | REGISTER |
|---|---|---|---|
| 0 | 0 | R | Receiver Buffer |
| 0 | 0 | W | Transmit Buffer |
| 0 | 1 | R/W | Interrupt Enable |
| X | 2 | R | Interrupt ID |
| X | 2 | W | FIFO Control |
| X | 3 | R/W | Line Control |
| X | 4 | R/W | Modem Control |
| X | 5 | R/W | Line Status |
| X | 6 | R/W | Modem Status |
| X | 7 | R/W | Scratch |
| 1 | 0 | R/W | Divisor Latch (least significant byte) |
| 1 | 1 | R/W | Divisor Latch (least significant byte) |

Figure 7

| 7 | 6 | 5 | 4 | 3 | 2 | 1 | 0 |
|---|---|---|---|---|---|---|---|
| Always 0 | Always 0 | Always 0 | Always 0 | Modem Status | Receiver Line Status | Transmitter Holding Register Empty | Receiver Data Available |

| 7 | 6 | 5 | 4 | 3 | 2 | 1 | 0 |
|---|---|---|---|---|---|---|---|
| FIFO enabled | FOFO enabled | Always 0 | Always 0 | Interrupt ID | Interrupt ID | Interrupt ID | Interrupt pending |

| FIFO Mode Only | Interrupt Identification Register | | | Interrupt Set and Reset Functions | | | |
|---|---|---|---|---|---|---|---|
| Bit 3 | Bit 2 | Bit 1 | Bit 0 | Priority | Interrupt Type | Interrupt Source | Interrupt Reset Control |
| 0 | 0 | 0 | 1 | - | - | - | - |
| 0 | 1 | 1 | 0 | 0 | Receiver Line Status | Overrun Error, Parity Error, Framing Error, Break Interrupt | Reading the Line Status Register |
| 0 | 1 | 0 | 0 | 1 | Received data available | Receiver data available or trigger level reached | Reading the Receiver Buffer Register or the FIFO drops below the trigger level |
| 1 | 1 | 0 | 0 | 1 | Character time-out indication | No characters have been removed from or input to the RCVR FIFO during the last 4 char times and there is at least 1 char in it during this time | Reading the Receiver Buffer Register |
| 0 | 0 | 1 | 0 | 2 | Transmitter Holding Register empty | Transmitter Holding Register empty | Reading the IIR (if source of interrupt) or writing into the Transmitter Holding Register |
| 0 | 0 | 0 | 0 | 3 | Modem Status | Change in CTS, DSR, RI, or DCD | Reading the MSR |

Figure 10

| 7 | 6 | 5 | 4 | 3 | 2 | 1 | 0 |
|---|---|---|---|---|---|---|---|
| Receiver Trigger Level<br>Bit 7  Bit 6  Level<br>0      0      1<br>0      1      4<br>1      0      8<br>1      1      14 | | Reserved | Reserved | DMA Mode Select | XMIT FIFO Reset | RCVR FIFO Reset | FIFO Enable |

| 7 | 6 | 5 | 4 | 3 | 2 | 1 | 0 |
|---|---|---|---|---|---|---|---|
| Divisor Latch Access Bit | Set Break | Stick Parity | Even Parity Select | Parity Enable | Number of Stop Bits | Word Length | |

| 7 | 6 | 5 | 4 | 3 | 2 | 1 | 0 |
|---|---|---|---|---|---|---|---|
| Always 0 | Always 0 | Always 0 | Loopback | Out 2 | Out 1 | RTS | DTR |

| 7 | 6 | 5 | 4 | 3 | 2 | 1 | 0 |
|---|---|---|---|---|---|---|---|
| Error in RCVR FIFO | Transmitter Empty | Transmitter Holding Register Empty | Break Interrupt | Framing Error | Parity Error | Overrun Error | Data Ready |

| 7 | 6 | 5 | 4 | 3 | 2 | 1 | 0 |
|---|---|---|---|---|---|---|---|
| DCD | RI | DSR | CTS | Delta DCD | Delta RI | Delta DSR | Delta CTS |

660

DOS BASED APPLICATION SUPPORTS FOR A CONTROLLERLESS MODEM

CROSS REFERENCE TO RELATED APPLICATIONS

This application is related to application Ser. No. 08/774,648, filed Dec. 30, 1996, in the name of Richard P. Tarquini and entitled REAL TIME SERVICES IN BACKWARDLY COMPATIBLE OPERATING SYSTEMS, which is hereby incorporated by reference in its entirety.

This application is also related to application Ser. No. 08/832,622 filed Mar. 31, 1997 in the names Jim Bader, Scott Deans, Rob Miller, Richard P. Tarquini, Bankim Wani and Jack Waters and entitled CONTROLLERLESS MODEM, which is hereby incorporated by reference in its entirety.

TECHNICAL FIELD OF THE INVENTION

The invention relates to communications systems, and, more particularly to DOS-based application support for a controllerless modem.

This invention relates to multitasking computer systems and methods, and, more particularly, to techniques for ensuring adequate CPU resources to a real time application serviced by an operating system which is backwardly compatible to permit the execution of DOS applications.

BACKGROUND OF THE INVENTION

Computers which use a modem for communications are well-known in the art.

Communications between a computer and a modem typically occurs over a universal asynchronous receiver transmitter (UART) link. Modems can be connected to computers by inserting a modem card into a bus connector for connecting to the computer bus directly (an internal modem) or can be connected over a communications port (an external modem). Internal and external modems of the prior art typically have an onboard processor or controller for managing data protocols and transfers. The existence of an onboard processor is necessary, in the prior art, in order to ensure that modem functions get adequate processing time. The need for a dedicated processor is particularly acute in a multi-tasking computer system in which a plurality of tasks may be running simultaneously. If those tasks fail to relinquish the processor to a modem application in a timely fashion, data characters will be lost and a data transfer can be aborted.

The provision of a separate processor or controller to run a modem, merely to ensure adequate processing power for modem tasks, is expensive and provides redundant capabilities to those which already exist on a computer hosting the modem. The host has its own processor, bus and system clock. Providing these redundantly in a modem provides additional costs which would be obviated if a modem could utilize the host processor capabilities in a controllerless modem implementation. Such an implementation would ideally handle legacy DOS applications as well as 16 bit and 32 bit applications.

Newly designed microprocessors may include enlarged memory addressing facilities and revised architecture which result in enhanced capabilities. When such microprocessors are used in new computer systems, they often produce computers which are functionally superior to their predecessors due to these enhanced capabilities. Despite any functional advantages a new computer may have over its predecessors, a computer employing an improved microprocessor may not be a commercial success. Computer programs, sometimes referred to as "software," are microprocessor specific. Therefore, when a computer employing a new microprocessor is introduced into the marketplace, there is generally little or no software which can run on it. Existing software, written for previous microprocessors, is likely incompatible with the new computer. As a result, sales of such new computers will often be sluggish until consumers see that adequate software is available for the computer. Additionally, consumers with libraries of software for existing computers may be reluctant to purchase new computers which would require them to invest in all new software. This problem is often compounded by the fact that software writers and publishers are reluctant to produce software for a new microprocessor until sales of computers incorporating the microprocessor are sufficient to create a relatively large group of potential purchasers of the software. This "wait and see" attitude on the part of both consumers and software writers can jeopardize the success of a new microprocessor and computers using the microprocessor.

Designers of new microprocessors sometimes attempt to solve this problem by designing a new microprocessor such that it will operate in multiple modes. In a first mode, for example, the microprocessor will emulate a prior microprocessor and run existing programs written for the prior microprocessor. In a second mode, the microprocessor will make full use of its enhanced capabilities. Such a design will enable manufacturers of computer systems using the microprocessor to advertise that the entire body of existing programs written for the prior microprocessor will run on their computer, thereby (in theory) stimulating computer sales to a point where software writers will begin to write programs designed to run in the new enhanced mode.

One such microprocessor is the Intel 80286, which is manufactured by the Intel Corporation of Santa Clara, Calif. The design and operation of the Intel 80286 is described in detail in a publication entitled "iAPX286 Programmer's Reference Manual Including the iAPX286 Numeric Supplement," which is available from the Intel Corporation and is hereby incorporated by reference.

The Intel 80286 (hereinafter "80286") operates in two modes. In a first mode, called the "real mode," the 80286 emulates the architecture of Intel's previous 8086, 8088 microprocessor family, which is used in the IBM PC and compatible computers, for example. Thus, computer which incorporate the 80286 microprocessor, such as the IBM PC/AT, can run existing 8086 programs written for the IBM PC and compatible computers.

In a second mode, called the "protected mode," the 80286 architecture provides enlarged memory addressing capability, enhanced multitasking support features, and a sophisticated protection scheme.

Another such microprocessor is the Intel 80386. The design and operation of the Intel 80386 is described in detail in a publication entitled "iAPX386 Programmer's Reference Manual Including the iAPX386 Numeric Supplement", which is available from the Intel Corporation and is hereby incorporated by reference.

The 80386, in addition to a real and protected mode as described above for the 80286, has a third mode, called virtual-8086 mode. In virtual 8086 the 80386 emulates the 8086 processor in a manner similar to the real mode. The distinction between real and virtual-8086 mode is that in virtual-8086 mode the 80386 provides memory-management, protection, and multitasking support. The virtual-8086 mode allows 8086 programs to execute as a task on the 80386. Each task in virtual-8086 mode has the illusion that it is executing on an 8086.

A virtual machine monitor (VMM), which is special operating-system software, coordinates the multitasking of several 8086 programs. The VMM executes in protected mode. There are two standard techniques for transferring control from a task to a VMM so that another task can be started. First, the VMM configures to 80386 so that all interrupts, software and hardware, that are executed by an 8086 program cause control to be transferred to the VMM. Second, the VMM sets a timer interrupt. When interrupted after the specified interval, the VMM receives control.

These techniques can be used to support the transfer from 8086 program that are designed to execute under a disk operating system (DOS). A typical personal computer DOS, such as MS-DOS Version 3.X offered by Microsoft Corporation of Redmond, Wash., is a single-threaded operating system; that is, DOS is not designed to support a multitasking environment. When DOS is executed in a multitasking environment, problems can occur when DOS is interrupted. If DOS is randomly interrupted during the execution of a function, such as during execution of an interval timer, then the transfer to another task can cause the DOS data structures to be corrupted. Consequently, a VMM will allow DOS to complete a function before another task is started. Upon exit from a DOS system call, the DOS data structures are in an appropriate state.

Unfortunately, a VMM that allows all functions calls to complete before transferring tasks will result in poor system performance. Several system calls of DOS may take an indefinite amount of time to complete. For example, a call to retrieve a character from the keyboard will not complete until a key is actually entered. Similarly, if a program issues a system call to read from a communication port, the system call will not complete until a character is actually received. The DOS loops through a section of code checking the port to see if the character has been received. Consequently, no other task can be scheduled for this indefinite period of time.

A timer interrupt of system calls of indefinite duration is insufficient because the VMM does not know whether the DOS was in a state where the data structures were non-corruptible.

U.S. Pat. No. 4,974,159 to Hargrove et al. which issued on Nov. 27, 1990 addresses the problem of DOS routines failing to transfer control to a virtual machine manager (VMM) by writing a virtual machine breakpoint instruction into the executable code to ensure that control will transfer to the virtual machine manager periodically so the system will not lock up by virtue of the DOS application. In Hargrove's approach, certain points in program execution are detected where a task switch can occur without corrupting the DOS data structures. Certain of these points are selected for the insertion of a virtual machine breakpoint. When the breakpoint is reached in execution, the virtual machine manager is then free to start another task or perform other functions without corrupting the DOS data structures. The breakpoint locations used for insertion of a virtual machine breakpoint by Hargrove are located in DOS system calls of indefinite duration, such calls to read a keyboard call. If no key is pressed, then the application will hold until a key is pressed. Hargrove provides no examples of placing virtual machine breakpoints at any other type of location.

The implementation of Hargrove's technique requires that a copy of the selected routine be separately stored to recover portions of the code overwritten by the one byte virtual machine breakpoint instruction in the executable code. This is complicated and requires unnecessary process steps and storage.

The Windows95 operating system is an operating system of the type described above which is subject to CPU hogging by a DOS application running in a virtual machine environment.

The Intel Architecture Signal Processing Operating System (IASPOX) introduce the concept of native signal processing (NSP) and was developed by Intel and Spectron Microsystems.

The IASPOX operating system brings along with it significant overhead in regard to system memory and CPU usage and utilization. IASPOX must be purchased and installed separately on the host computer. IASPOX takes over the PC's scheduling of tasks and only runs windows applications/drivers when IASPOX applications are idle. IASPOX reprograms the real-time clock to approximately 900 microsecond granularity, incurring significant interrupt (15 $\mu$Sec per interrupt on 486/66 Mhz in protected mode) overhead even if no IASPOX tasks are running. Rounded down to 1000 interrupts per/second or once every millisecond and the interrupt latency alone would consume 1.5% of CPU without executing any code.

Currently IASPOX is not endorsed by Microsoft since it does not follow the VxD programming model and undermines the Window 95 kernel. Approximately 80% of the current IASPOX code is already in Windows95, leading to redundant interfaces and needless memory consumption. It also requires programmers to lean a new kernel and associated primitives, tools and development environment (15 MB of disk space).

In addition, IASPOX apparently runs as a super operating system with Windows95 operating as a task thereunder. In this way, IASPOX maintains control over access to the processor, regardless of the Windows95 state.

SUMMARY OF THE INVENTION

In accordance with the invention, methods, apparatus systems and computer program products are provided which enable a virtual device driver to control communications from a DOS application over a controllerless modem.

In accordance with the invention, real time applications can be guaranteed CPU access regardless of the state of any applications, including DOS applications concurrently running. In accordance with the invention, nested execution/priority event mechanisms provided by a virtual machine manager are utilized to provide that access. The invention is implemented as a process, called Real Time Services or RTS. RTS is implemented as a Virtual Device Driver (VxD) which schedules a priority call back function to be run, regardless of which application or virtual machine is executing.

The invention relates to methods and apparatus for scheduling a repetitive process in a computer by running a scheduling process which interacts with the operating system and at least one process or device to ensure CPU access regardless of the state of any application running on the computer.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 7 is a table showing addressing of the registers shown in FIG. 6.

FIG. 8 is an illustration of the contents of an Interrupt Enable Register.

FIG. 9 is an illustration of the contents of an Interrupt Identification Register.

FIG. 10 is a table of the bit maps and priorities of the five possible interrupt sources.

FIG. 11 is an illustration of the contents of a FIFO Control Register.

FIG. 12 is an illustration of the contents of a Line Control Register.

FIG. 13 is an illustration of the contents of a Modem Control Register.

FIG. 14 is an illustration of the contents of a Line Status Register.

FIG. 15 is an illustration of the contents of a Modem Status Register.

DETAILED DESCRIPTION OF THE INVENTION

Figure 1A:
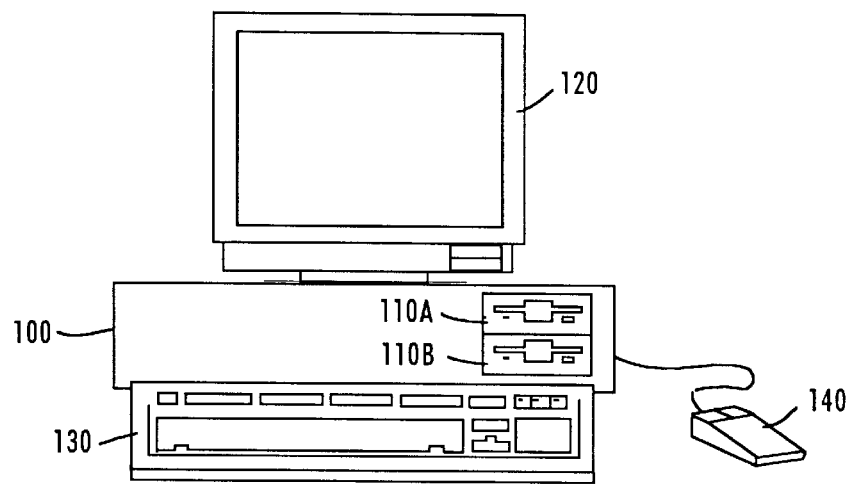
FIG. 1A is an illustration of a computer suitable for use in carrying out the invention.

FIG. 1A is an illustration of an exemplary computer of a type suitable for use in carrying out the invention. FIG. 1A illustrates a computer system having a processor unit 100, a display unit 120, a keyboard 130, and an input/output device, such as a mouse 140. One or more disk drives 110A and 110B may be provided in the processor unit 100 to facilitate the storage and retrieval of information. One of these may be a hard drive (not shown) or drives utilizing removable media such as floppy drives or CD ROM drives.

Figure 1B:
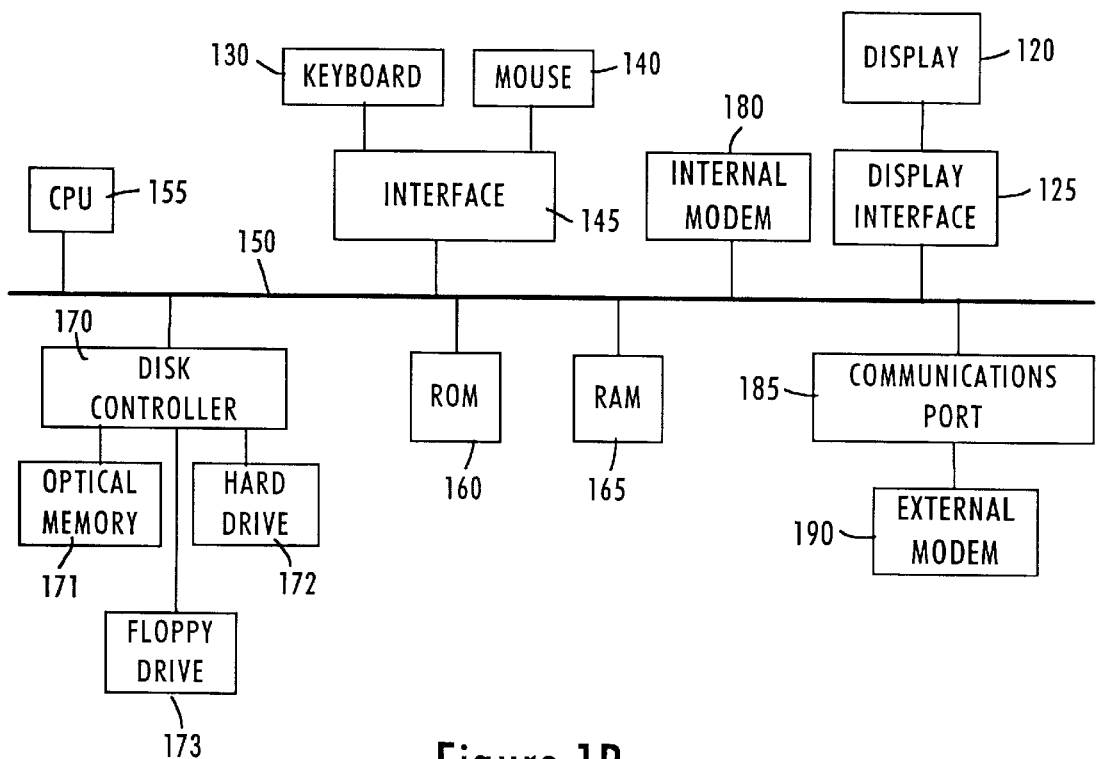
FIG. 1B is a block diagram of an exemplary bus architecture suitable for carrying out the invention.

FIG. 1B is a block diagram of an exemplary computer bus architecture of a type suitable for carrying out the invention. A bus 150 connects a central processing unit 155 to other elements of a computer processor system 100. An interface 145 connects external input/output devices such as keyboard 130 and mouse 140. A display interface 125 is also connected to the bus and interfaces the computer display 120 to the central processing unit and to other devices. In this exemplary embodiment, read only memory (ROM) 160 and random access memory (RAM) 165 provides storage of program and data information utilized by the CPU 155. A disk controller 170 permits information to be read from and written to mass storage such as optical memory 171, hard drive 172 and floppy drive 173. A communications port 185 provides a communications interface between external devices and the computer bus 150. An internal modem 180 connects directly to the bus 150 of the computer. The communications port may optionally be utilized to connect to an external modem 190 if an external modem is utilized either in lieu of or as supplemental to internal modem 180.

Figure 1C:
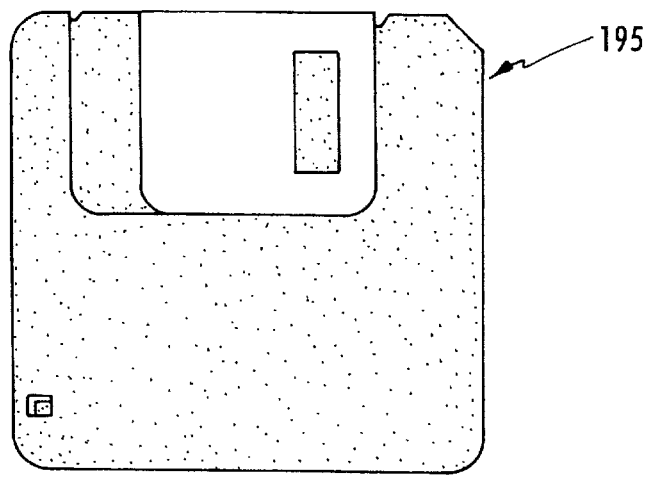
FIG. 1C is an illustration of an exemplary memory medium suitable for storing program information and data.

FIG. 1C is an illustration of an exemplary memory medium suitable for storing program and data information in accordance with the invention. In the example shown, program and data information are stored on a floppy disk 195.

Figure 1D:
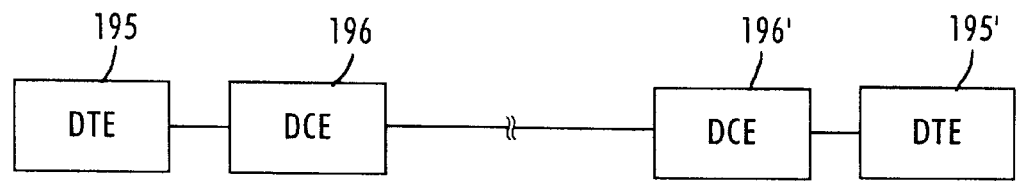
FIG. 1D is a block diagram of computer-to-computer communications.

FIG. 1D is a block diagram of computer-to-computer communications. Historically, a terminal or computer driving a modem is referred to as data terminal equipment (DTE) such as DTE 195 shown in FIG. 1D. The data terminal equipment interfaces with data communications equipment (DCE) 196 and DCE 196 connects with DCE 196' across a communications link. The DCE at the other end (196') connects with its own receiving host DTE 195'. DCEs are typically modems and the interface specifications which describe how a computer interacts with a modem are standardized and well-known. Similarly, the way that two DCEs interact when passing data is also standardized and known. The communications may occur by direct connection or over a network.

Figure 2:
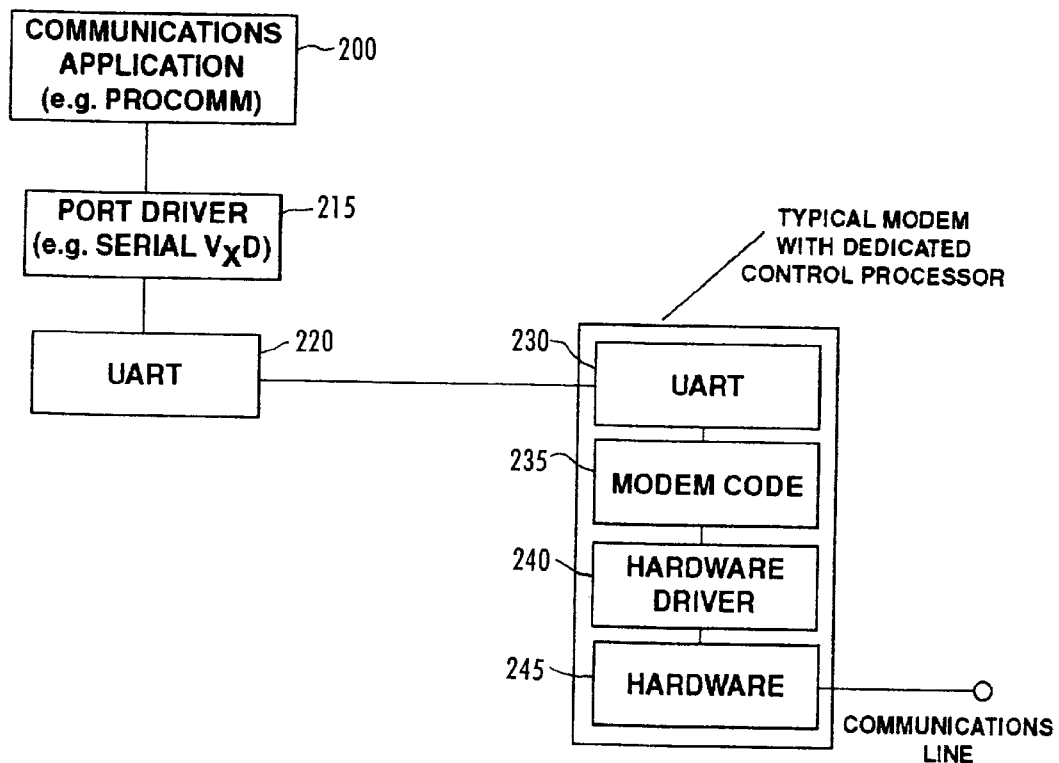
FIG. 2 is a block diagram showing exemplary software and hardware relationships between a computer (DTE) and a modem (DCE) of the prior art.

FIG. 2 is a block diagram showing exemplary software and hardware relationships between a computer (DTE) and a modem (DCE) of the prior art. On the computer side, an application program 200, such as terminal software used for controlling communications, runs over an operating system layer 210. The operating system provides a consistent interface to certain lower level services as is known in the art. In this case, the application system layer 200 interfaces a port driver 215 which controls a universal asynchronous receiver transmitter (UART) 220. When the computer is connected to a modem, either an internal or an external modem, the UART from the computer 220 connects to a UART 230 in the modem. That way, data and instructions are sent from the computer to the modem. Data and instructions from the UART are processed by a block of modem code 235 which may vary from manufacturer to manufacturer of modems. The modem code controls the modem hardware 245 via a hardware driver 240 to send and receive data to and from the modem communications line. Although not expressly shown in FIG. 2, modems, be they internal or external, typically have their own processor, bus and supporting hardware for running the modem code 235 and for carrying out the other functions required in the modem.

Figure 3:
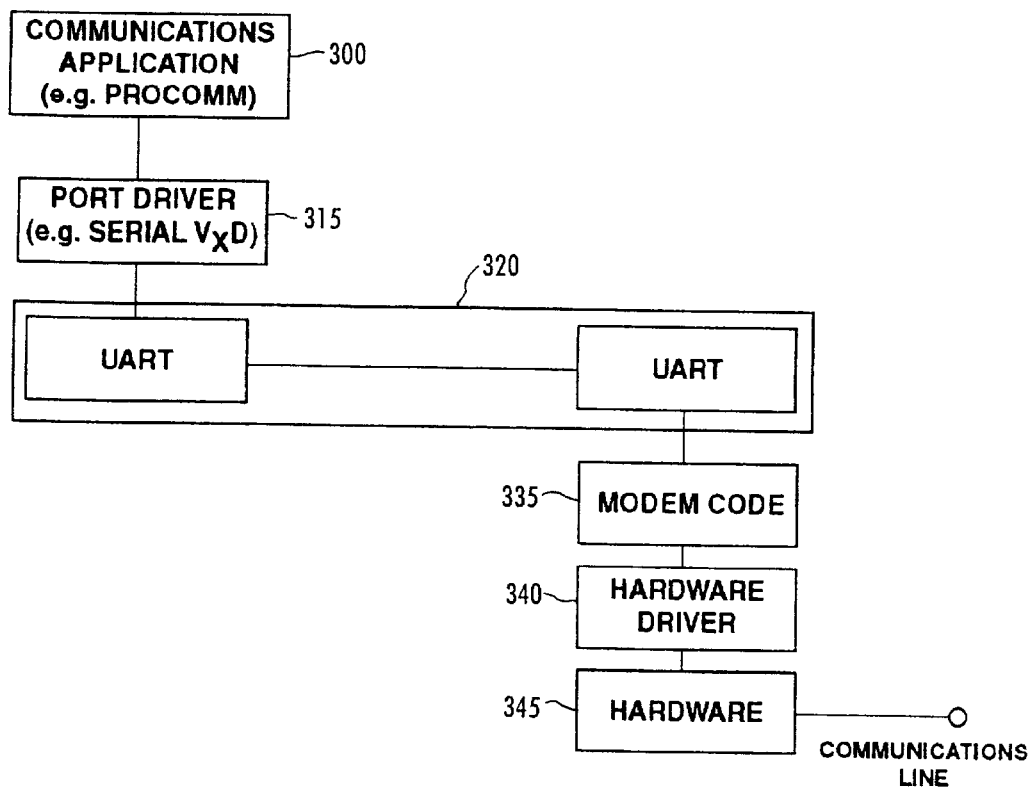
FIG. 3 is a block diagram showing the transition from a traditional modem with external controller to a controllerless modem.

FIG. 3 is a block diagram showing the transition from a traditional modem with external controller to a controllerless modem. A communications application 300 and port driver 315 operate as shown in corresponding blocks in FIG. 2. However, the hardware UARTs of FIG. 2 are replaced with a software emulation of a UART to UART link shown at block 320. The modem code and hardware driver shown at 340 and the hardware 345 operate as shown before. By replacing UART to UART communications with a UART emulation layer, minimal change is required to the other software layers. Specifically, minimal changes are required to the existing modem code as well as to the host suite of software. CPU timing is preferably guaranteed by using a virtual device driver as described in the aforesaid U.S. patent application Ser. No. 08/774,648.

Figure 4:
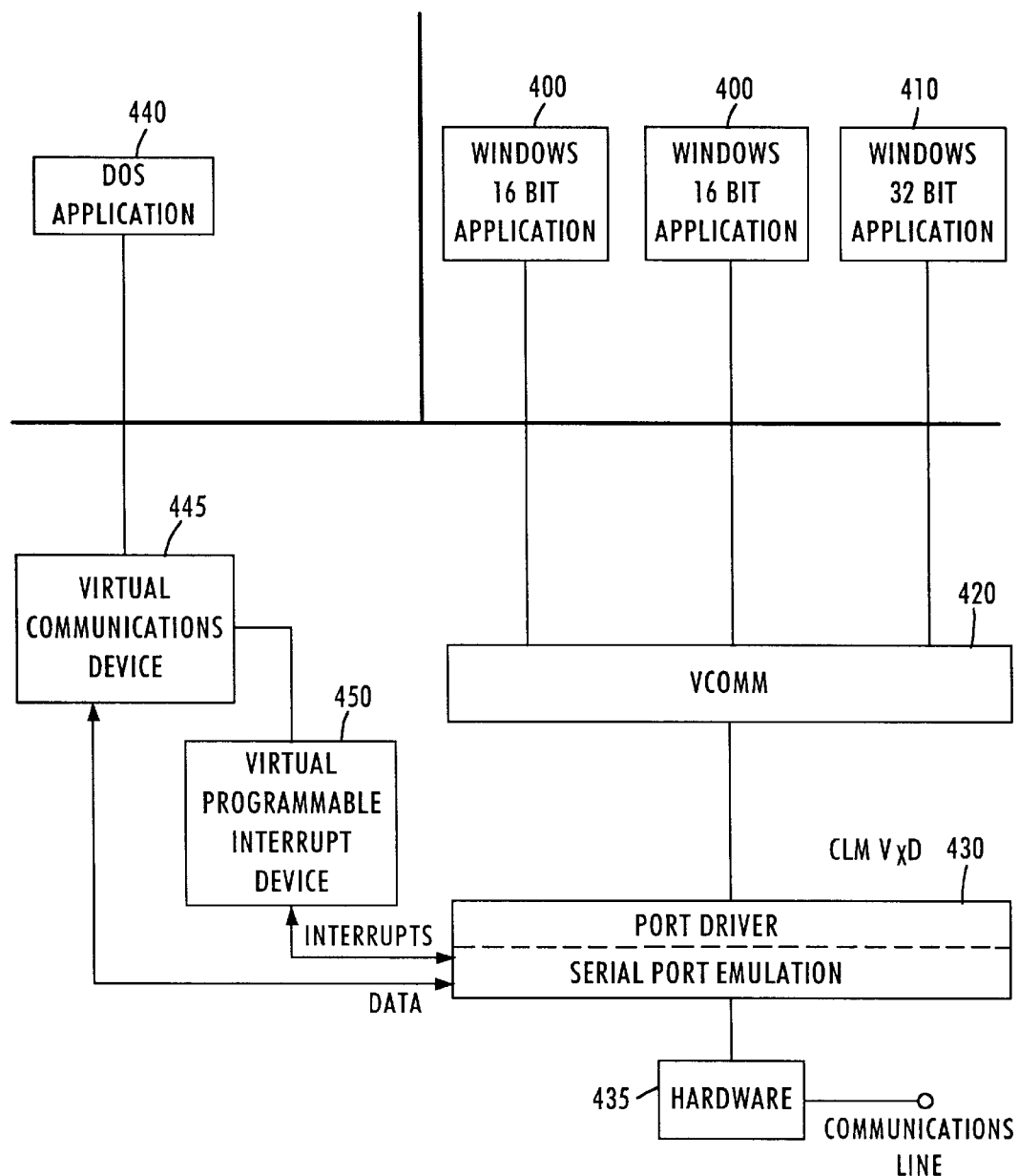
FIG. 4 is a block diagram of one way of implementing support for DOS applications in a controllerless modem environment in accordance with one aspect of the invention.

FIG. 4 is a block diagram of an implementation providing support for DOS applications in a controllerless modem environment in accordance with one aspect of the invention. 16-bit Windows applications 400 and 32-bit Windows applications 410 connect to a virtual device driver 420 such as VCOMM.VxD. A controllerless modem 430 such as the controllerless modem VxD of the aforesaid application includes port driver and serial port emulation layers operating between virtual device driver 420 and hardware 435. In this approach to managing DOS application communications, DOS applications 440 are connected to a virtual communications device 445, which operates as an interface between the DOS application and serial port emulation. Thus, data passes from DOS application 440 through the VCD 445 to the serial port emulation layer of the controllerless modem 430. Since interrupts need to be handled as well as data, a virtual programmable interrupt device 450 receives interrupts intercepted by the virtual communications device 445 and passes them to the serial port emulation layer of controllerless modem 430. Since there may be contention for the controllerless modem, the virtual communications device 445, the virtual device driver 420 and the controllerless modem 430 manage competing requests for services. Interrupts from hardware 435 are passed over the serial port emulation layer of the controllerless modem to the virtual programmable interrupt device 450 and, if needed, through VCD 445 to the DOS application 440.

Using a traditional controller based modem in a modem operating system such as Windows 95, a DOS application hooks the standard serial port hardware interrupts and issues reads and writes to the standard I/O ports.

Figure 5:
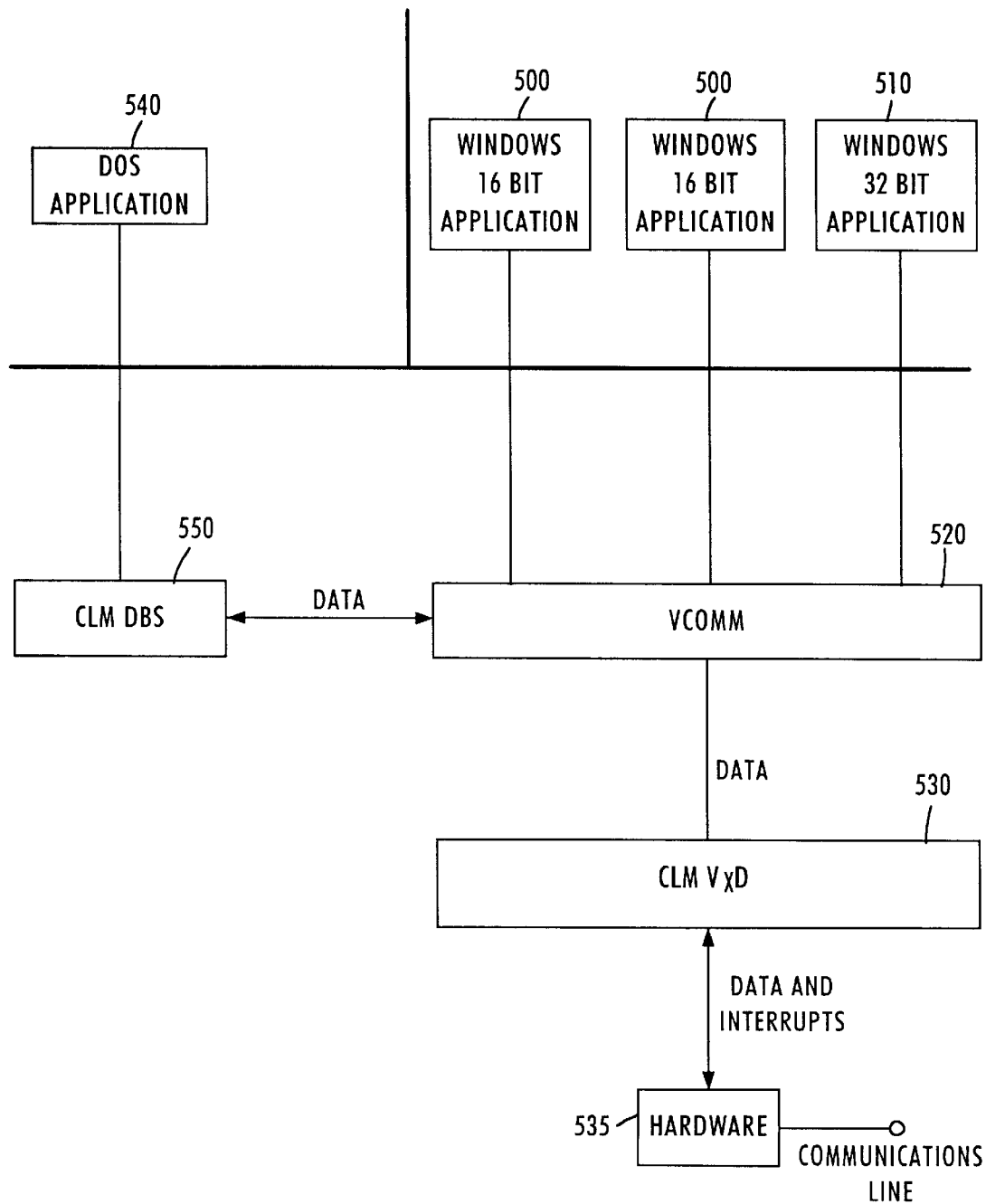
FIG. 5 is a block diagram of the preferred way implementing support for DOS applications in a controllerless modem environment, using a controllerless modem DOS box support (CLM DBS) virtual device driver (VxD) in accordance with another aspect of the invention.

In a controllerless modem, such as shown in FIG. 5, the standard serial port interface is replaced with a non-standard hardware interface. Controllerless modem virtual device driver 530 is supplied to interface to the non-standard hardware. To support DOS applications, a port virtualization virtual device driver 550 will be put in place of VCD 445. From here on this virtual device driver 530 will be referenced to as CLM DBS.

As shown in FIG. 5, CLM DBS will redirect I/O accesses to a communications interface 520 such as VCOMM and generate hardware interrupts to the DOS application. VCOMM in turn interfaces with the controllerless modem.

The CLM DBS will emulate the critical functionality of a UART allowing a DOS application to read and write to standard I/O port addresses and to install interrupt handlers for standard serial port interrupts.

The Windows 16-bit and 32-bit applications 500 and 510 interface the controllerless modem VxD 530 through VCOMM 520 as shown in FIG. 5. Similarly, hardware 535 interfaces the controllerless modem 530 and exchanges data and interrupts with it. DOS applications, such as DOS application 540 interface the virtual device driver 520 over a virtual device driver entitled controllerless modem DOS box support (CLM DBS) 550. CLM DBS 550 is the preferred form of the invention and it is described in considerable detail hereinafter. The registers of the CLM DBS are accessible by VCOMM and the controllerless modem. CLM DBS 550 lets DOS applications think it is talking directly to a UART.

Although one embodiment is described in detail hereinafter, various implementations may differ in which functionality is allocated to the CLM VxD, VCOMM.VxD and CLM DBS without departing from the spirit of the invention. In addition to sending to a controllerless modem 530 over VCOMM, the CLM DBS can equally well control a real mode output or control arbitrary port device drivers. The preferred arrangement is shown.

Figure 6:
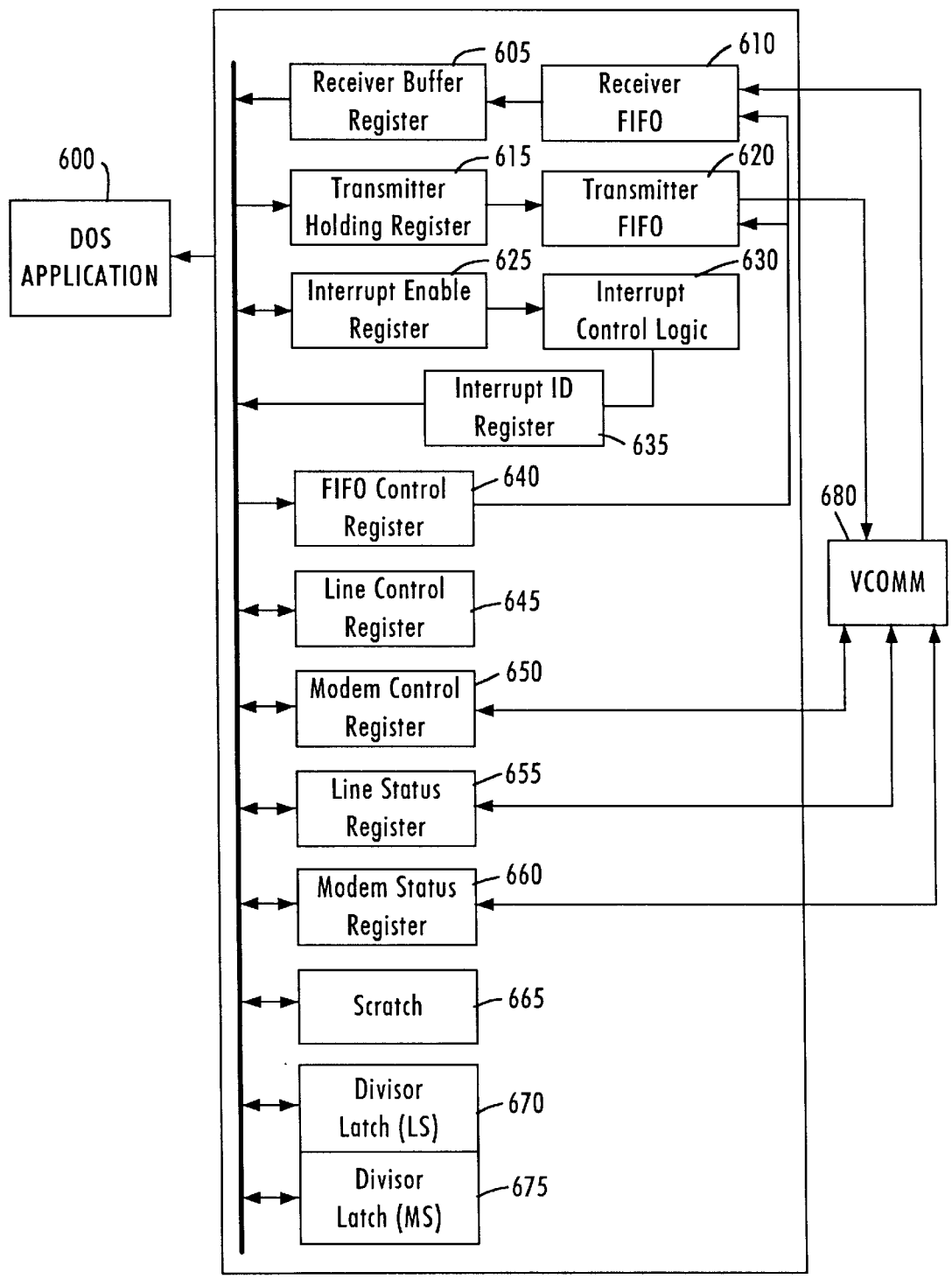
FIG. 6 is a block diagram of registers used in implementing a CLM DBS VxD.

FIG. 6 is a block diagram of registers used in implementing a CLM DBS 550. Starting with the base address of the emulated UART, eight addresses are available allowing access to a total of twelve registers. Some registers share a common address and are differentiated by the state of the divisor latch access bit (DLAB) and whether the I/O access is a read or write operation. FIG. 7 lists the twelve UART registers that are to be emulated. FIG. 7 shows the internal data flow of the emulated UART registers in the CLM DBS. Because of the lack of a real UART, certain registers will not necessarily have any functionality beyond that of storing a value set by the DOS application.

The following sections summarize the function of each register.

The Receive Buffer Register 665 is a read only register that DOS applications will read to retrieve data received by CLM DBS from VCOMM 680. CLM DBS is responsible for buffering data when FIFO mode is enabled. The size of the data buffer is determined for each particular implementation.

The Transmitter Holding Register 615 is a write only register that DOS applications will write to in order to send a byte of data to the modem. CLM DBS is responsible for buffering data when FIFO mode is enabled. The size of the data buffer is also determined for each particular implementation.

As shown in FIG. 8, bits 0–3 of the Interrupt Enable Register 625 are used to enable the four types of interrupts supported by the UART. An interrupt is enabled by setting the corresponding bit to 1.

As shown in FIG. 9, the Interrupt Identification Register (IIR) 635 is a read only register that identifies the source of the UART interrupt. Multiple interrupt sources can be active simultaneously, thus the highest priority pending interrupt is reported at the time the DOS application reads the IIR. Note that the interrupt pending bit (bit 0) is active low.

FIG. 10 shows the bit-maps and priorities of the five possible interrupt sources. Priorities range from 0 to 3 with 0 being the highest.

The CLM DBS emulates how a real UART with a hardware interrupt line would appear to a DOS application.

As shown in FIG. 11, the FIFO Control Register 640 is a write only register used to enable the FIFOs, clear the FIFOs, set the RCVR FIFO trigger level, and select the type of DMA signaling. As in a traditional UART, transmit and receive buffers of 16 bytes each will be supported. Receive character time-outs will be supported with timer values appropriate to a particular implementation.

As shown in FIG. 12, the Line Control Register 645 (LCR) is used to configure the asynchronous data communications exchange and set the Divisor Latch Access Bit (DLAB). In the CLM DBS only bits 6 and 7 are meaningful. When bit 7 is set to 1, registers 0 and 1 become Divisor Latch LSB and MSB respectively. Bit 6 is used to send breaks to VCOMM. The other six bits in the LCR need only be saved during a write to LCR and reported during a read from the LCR.

As shown in FIG. 13, the Modem Control Register 650 is used to control the interface with the modem. Bits 0 and 1 control DTR and RTS respectively and when changed the appropriate information should be passed along to VCOMM. Bits 2 and 3 should be saved but can be ignored. Bit 4 is used to provide a local loopback diagnostic test. Local loopback can be optionally implemented in CLM DBS.

As shown in FIG. 14, the Line Status Register 655 is used to report status of the data transfer to the DOS application. Because of the parallel interface with VCOMM, bits 2 and 3 will always be set to 0.

As shown in FIG. 15, the Modem Status Register 660 provides the current state of the control lines as reported by VCOMM. Bits 0–3 are used to indicate that bits 4–7, respectively, have changed since the last read operation.

The Scratch Register 665 does not affect the UART and is only necessary for compatibility. Any value written to this register should be saved and returned upon a read to this register.

The two Divisor Latch registers 670 and 675 are normally used to program the baud rate. Since the CLM DBS communicates directly with VCOMM, baud rate is meaningless. However, it is necessary to save values written to these registers to be reported during read operations. These values will also be used to set any necessary timers for simulating transmit and receive propagation delays. To calculate baud rates, it will be assumed that the input crystal is 1.84322 MHz.

Figure 16:
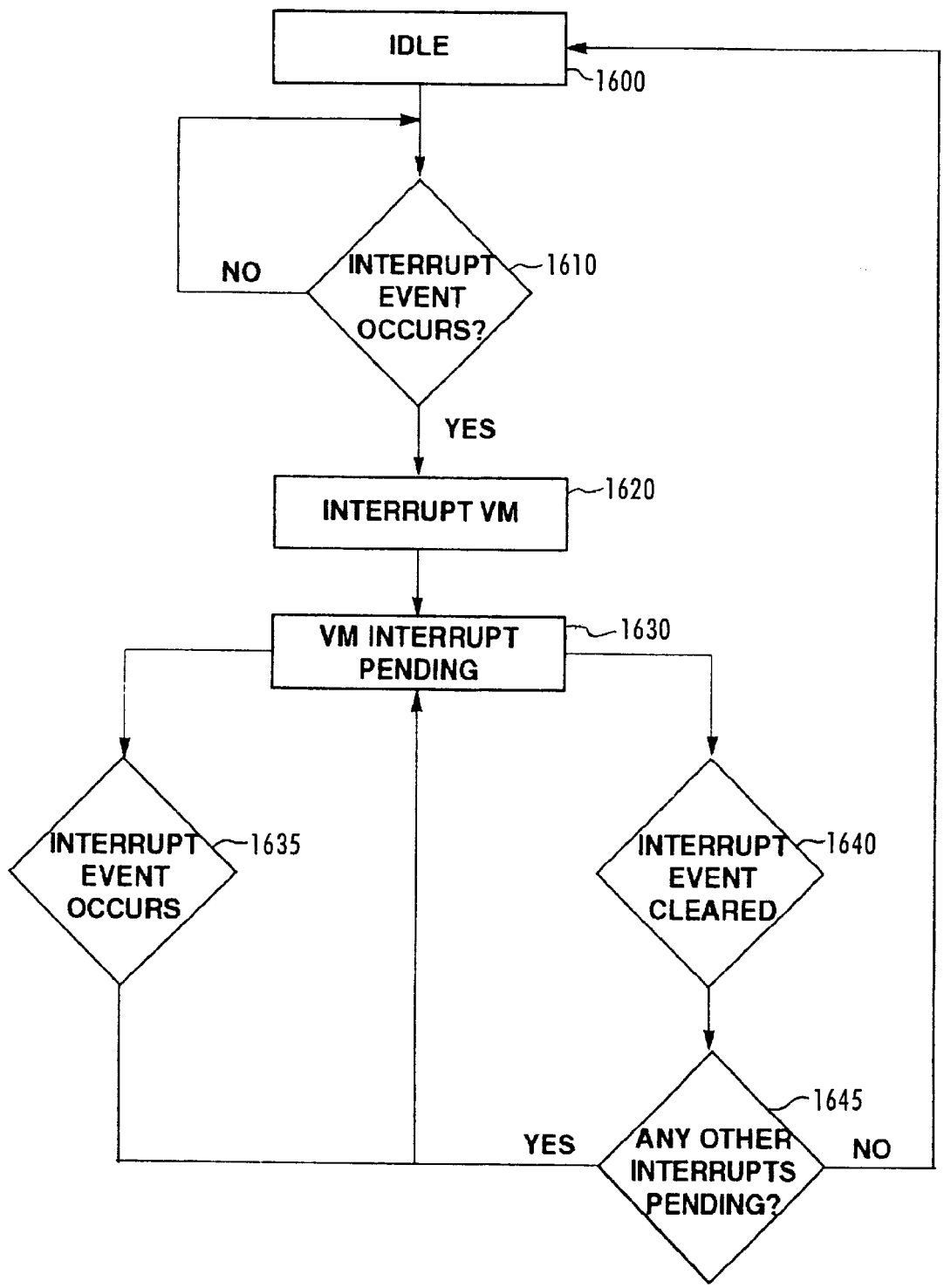
FIG. 16 is a flow chart of a process used to handle sending interrupts to the DOS virtual machine (VM).

FIG. 16 is a flow chart of a process used to handle sending interrupts to the DOS VM.

As shown in FIG. 10, five possible events can occur that would generate an interrupt to the DOS VM. The CLM DBS must emulate a hardware interrupt line to the DOS VM. Since multiple UART interrupt events can be cleared with one Interrupt Service Request (ISR) in the DOS VM, CLM DBS must be careful not to send unneeded interrupts to the DOS VM. To do this CLM DBS must track the state of this emulated interrupt line to ensure that no more interrupts than necessary are sent to the DOS VM.

FIG. 16 shows the logic used to handle sending interrupts to the DOS VM. As shown in FIG. 16, at block 1600, the process is idle. The process periodically checks for an interrupt (1610) and if one occurs, the virtual machine is interrupted (1620). Otherwise, the monitoring continues. If an interrupt is pending (1630) when an interrupt event occurs (1635) it is added to the scheduled pending list. If an interrupt event is cleared (1640) and there are no other interrupts pending (1645-NO) the process reverts to idle status. Otherwise, the interrupt is cleared and the next interrupt on the pending list is handled.

It is also important to ensure that no interrupt events are missed. As in a real UART, when the IIR register is accessed, CLM DBS will freeze all interrupts by holding off any VCOMM interrupt event updates until the IIR access is complete.

In a hardware UART, a certain amount of time is required to transmit each byte of data. This normally limits the frequency of UART interrupts a DOS application receives. The table below lists transfer times for selected DTE speeds.

| UART Byte Transfer Times | | |
| --- | --- | --- |
| DTE Speed (bps) | Time required to transfer 1 byte | Time required to transfer 14 bytes |
| 9600 | 1.04 ms | 14.53 ms |
| 14400 | 694 $\mu$s | 9.716 ms |
| 38400 | 260 $\mu$s | 3.640 ms |
| 57600 | 173 $\mu$s | 2.422 ms |
| 115200 | 86.8 $\mu$s | 1.215 ms |

The times required to transmit were calculated using the following equations, assuming 10 bits per byte.

Time to Transmit 1 byte $$T_{byte} = \frac{10}{\text{Speed}}$$

Time to Transmit 14 bytes $$T_{14\ bytes} = T_{byte} \times 14$$

With the CLM, bytes are no longer transferred serially. Therefore, the transfer times are significantly reduced to the amount of time needed to copy a byte. This can cause problems if a DOS application were to get interrupted much more often than would normally would be expected if a hardware UART were being used. To prevent problems, the CLM DBS will be implemented so as to simulate the transfer times shown in the above table. This will be done by buffering the data and using timers to determine when to interrupt the DOS VM.

The timing mechanisms are set up to simulate the same timing whether the application is running in interrupt or polled mode. Specifically, not only must the interrupts to the VM be delayed by a timed amount, events such as updating the transmitter holding register empty bit must also be delayed by the same timed amount.

The following data structures are used in the CLM DBS and are internal to the CLM DBS VxD.

A block of twelve bytes will be used to emulate the twelve registers of the UART.

FIFOs will be used to store bytes temporarily during transfers between CLM DBS and VCOMM. The size of the FIFO is set for a particular implementation by allocating a large amount of FIFO and then monitoring the statistics of the level of fill.

Flags are used to store the state of the following interrupt events:

Virtual interrupt line active (interrupt line to DOS VM)

Line Status interrupt pending

Receive data interrupt pending

Transmit Holding Register empty interrupt pending

Modem Status interrupt pending

The interfaces in and out of CLM DBS will be in the exemplary embodiment described herein standard Windows 95 system interfaces. These interfaces are broken down into the following categories:

The IRQ of the emulated UART are virtualized through the Virtual Programmable Interrupt Controller Device (VPICD). VPICD is given pointers to interrupt handlers inside the CLM DBS.

I/O trapping routines are installed into VM to handle all accesses to the emulated UART.

VCOMM interface routines are used to pass data between CLM DBS and VCOMM and are also used to handle system interfaces.

Figure 17:
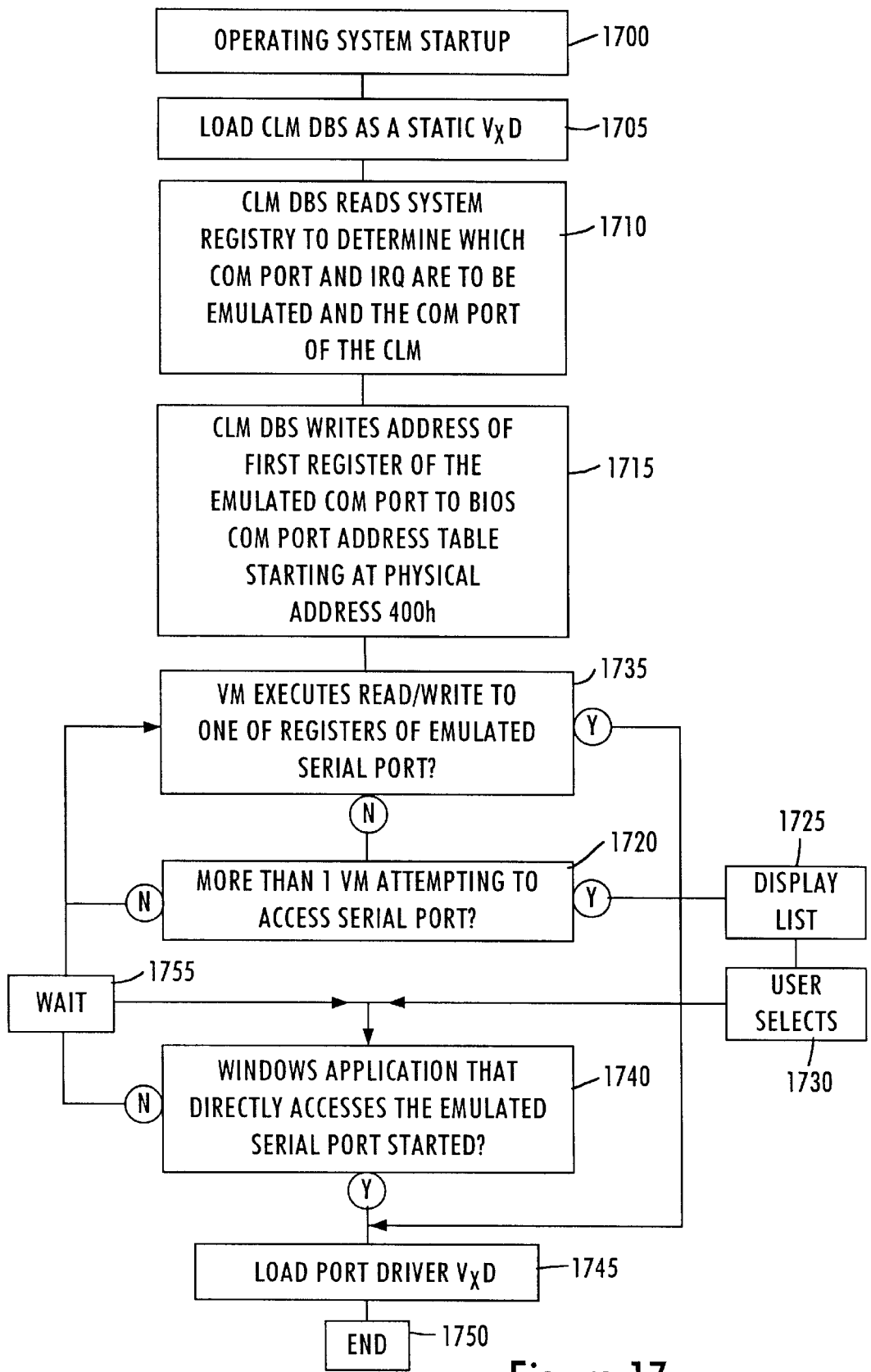
FIG. 17 is a flow chart of a process used to load the CLM DBS VxD and to load the port driver VxD.

FIG. 17 is a flow chart of a process used to load the CLM DBS VxD and to load the port driver CLM VxD.

The CLM DBS will be loaded by Windows 95 at start up as a static VxD (virtual device driver) (1700, 1705). CLM DBS will read the system registry to determine which com port and IRQ are to be emulated and the com port of the CLM (1710). Also during initialization, CLM DBS will need to write the address of the first register of the emulated comport to the appropriate entry in the BIOS com port address table starting at physical address 400h (1715). This is due to the fact that some DOS applications look up the address of the com port before accessing it.

Only one virtual machine (VM) should be accessing the emulated serial port at one time. In the event that more than one VM attempts to access the serial port by executing a read/write to one of the registers of the emulated serial port (1735), the user will be prompted (1720) to select which VM should be given ownership of the port. A list 1725 will be displayed and a user selection 1730 entered.

CLM DBS will load a port driver, CLM VxD (1745), when a VM executes a read or write to one of the registers of the emulated serial port. The port driver will remain loaded until that VM is closed. An alternative to this would be to set up timers to determine that the VM has stopped using the serial port and free the port driver to be used by another application. This method is not preferred in order to reduce the complexity of CLM DBS as well as keep the code more efficient by removing the overhead of checking and updating the timers.

With this design, if a user runs an application in a DOS VM (that uses the emulated serial port), the user must close the DOS VM before CLM VxD is available to any other applications (Windows or DOS). Also, if a Windows application that directly accesses the serial port runs, CLM DBS will load the CLM VxD port driver to be used by the system VM and the port driver will not be unloaded until Windows is restarted.

There has been disclosed a virtual device driver for permitting DOS-based applications to communicate with a controllerless modem in a particularly advantageous manner.

Figure 18:
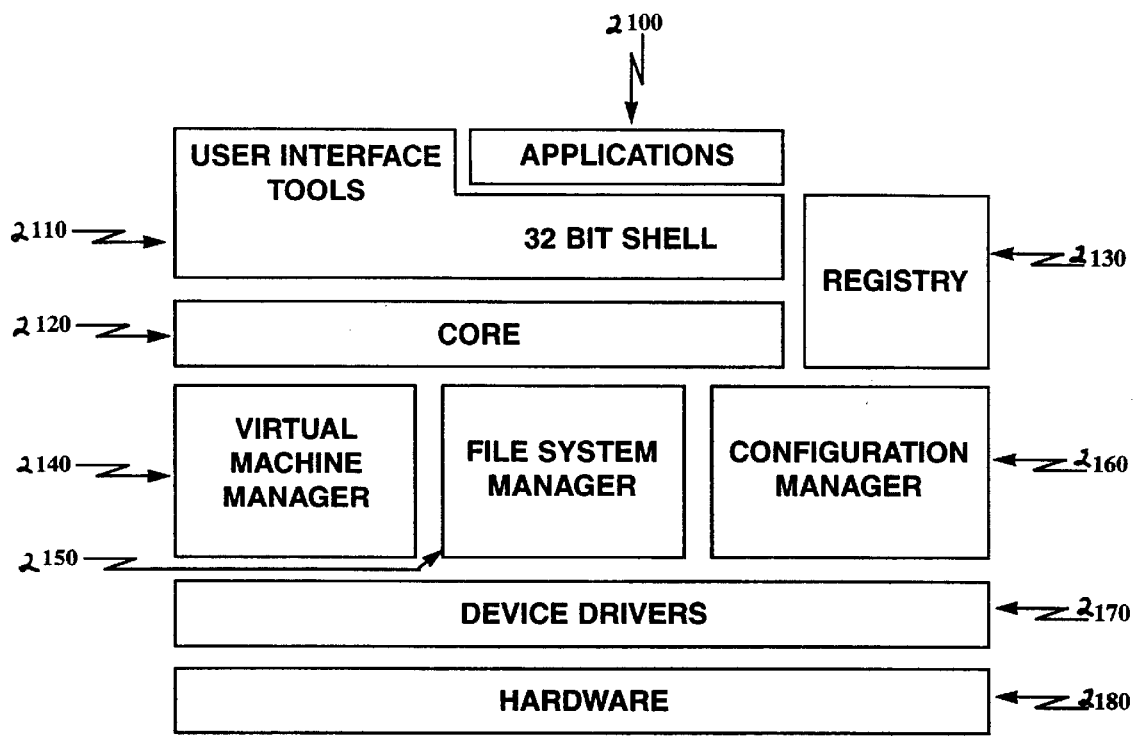
FIG. 18 is a representation of an exemplary prior art operating system useful for carrying on the invention.

FIG. 18 is a representation of an exemplary prior art operating system useful for carrying out the invention.

The application layer 2100 includes a variety of applications including 32 bit applications as well as 16 bit applications and DOS applications. Shell 2110 acts an interface to operating system core features. It also includes a plurality of user interface tools. The core is composed of three comments—a user area, a kernel area, and a graphical device interface.

The User component manages input from the keyboard, mouse, and other input devices and output to the user interface (windows, icons, menus, and so on). It also manages interaction with sound driver, timer, and communications ports.

The Operating System described in FIG. 18, preferably Windows95, uses an asynchronous input model for all input to the system and applications. As the various input devices generate interrupts, the interrupt handler converts these interrupts to messages and sends the messages to a raw input thread area, which in turn passes each message to the appropriate message queue. Although each 32 bit-based thread can have its own message queue, all 16 bit-based applications share a common message queue.

The Graphical Device Interface (GDI) is the graphical system that manages what appears on the screen. It also provides graphics support for printers and other output devices. It draws graphic primitives, manipulates bitmaps, and interacts with device-independent graphic drivers, including those for display and printer output device drivers.

The Kernel provides base operating system functionality including file I/O services, virtual memory management and task scheduling. Exception handling is another service of the Kernel. The Kernel also allocates virtual memory, resolves import references, and supports demand paging for the application. The Kernel provides services to both 16-bit and 32-bit applications.

The central information database in the operating system is called the Registry. This hierarchical database both simplifies the operating system and makes it more adaptable.

A primary role of the Registry in the operating system is to serve as a central repository for hardware-specific information for use by the hardware detection and Plug and Play system components. The operating system maintains information about hardware components and devices that have been identified through an enumeration process in the hierarchical structure of the Registry. When new devices are installed, the system checks the existing configuration in the Registry to determine the hardware resources (for example, IRQs, I/O addressees, DMA channels, and so on) that re not being used, so the new device can be properly configured without conflicting with a device already installed in the system.

Just as the Configuration Manager provides for all resources needed by each device on the computer, another component, the Virtual Machine Manager, provides for resources needed for each application and system process running on the computer. The Virtual Machine Manager creates and maintains the virtual machine environments in which applications and system processes run.

A virtual machine (VM is an environment in memory that, from the application's perspective, looks as if it is a separate computer, complete with all of the resources Machine Manager provides each application with the system resources it needs.

The operating system has a single VM called the System VM, in which all system processes run. In addition, all 32 bit-based and 16 bit-based applications run in this VM. Each MS-DOS-based application runs in its own VM.

The Process Scheduler is the component responsible for providing system resources to the applications and other processes you run, and for scheduling processes to allow multiple applications to run concurrently.

The Process Scheduler also schedules processes in a way that allows multiple applications and other processes to run concurrently. The operating system uses two methods for concurrent process scheduling—cooperative multitasking and preemptive multitasking.

In earlier operating systems such as Windows 3.1, applications run concurrently through a method known as cooperative multitasking. Using this method, the operating system required an application to check a message queue periodically and to relinquish control of the system to other running applications. Applications that did not check the message queue frequently would effectively "hog" CPU time and prevent the user from switching to another application. For compatibility reasons, the operating system cooperatively multitasks 16 bit-based applications.

The operating system uses preemptive multitasking for 32 bit-based applications. This means that the operating system takes control away from or gives control to another running task, depending on the needs of the system.

Unlike 16 bit-based applications, 32 bit-based applications do not need to yield to other running tasks to multitask properly. 32 bit-based applications can take advantage of multithreading, a mechanism that the operating system provides to facilitate the ability to run applications concurrently. A 32 bit-based application running in the system is called a process in terms of the operating system. Each process consists of at least a single thread of execution that identifies the code path flow as it is run by the operating system. A thread is a unit of code that can get a time slice from the operating system to run concurrently with other units of code, and must be associated with a process. However, a 32 bit-based application can initiate multiple threads for a given process to enhance the application for the user by improving throughput, enhancing responsiveness, and aiding background processing. Because of the preemptive multitasking nature of the operating system, threads of execution allow code to be smoothly processed in the background.

The IFS Manager arbitrates access to file system devices, and other file system device components.

To support Plug and Play functionality, the operating system architecture includes a Configuration Manager, which orchestrates the configuration process. This process might involve many bus and device architectures coexisting on a single system, with more than one device type using the same bus architecture, yet with each device having a separate set of configuration requirements. (A bus is the mechanism that allows information to be transferred between the computer and the device.) For example, a mouse and a keyboard can both use the same keyboard controller bus; a CD-ROM drive and a hard disk drive might both use the same SCSI bus.

Configuration Manager works with a number of subcomponents to identify each bus and each device on the system, and to identify the configuration settings for each device. Configuration Manager ensures that each device on the computer can use an IRQ, I/O port addresses, and other resources without conflict with other devices.

Configuration Manager also helps monitor the computer for changes in the number and type of devices present and manages the reconfiguration of the devices, as needed, when changes take place. As these events occur, Configuration Manager communicates the information to applications.

To perform its role, Configuration Manager calls on the bus enumerators to identify all the devices on their specific buses and their respective resource requirements.

The operating system provides improved support for hardware devices and peripherals including disk devices, display adapters, mice and other pointing devices, modems, fax machines, and printers.

In previous operating systems, such as Windows 3.1, device drivers were, for the most part, monolithic and complex to develop. The operating system being described uses a universal driver/mini-driver architecture that makes it easier for hardware vendors to provide device-specific code for their hardware.

Figure 19:
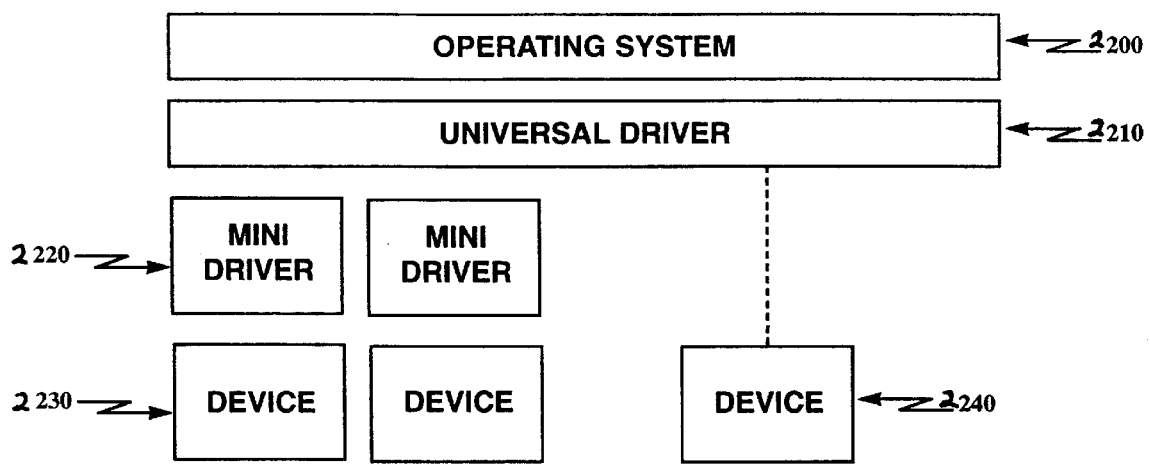
FIG. 19 is a block diagram of components of an exemplary device driver for the operating system shown in FIG. 18.

As shown in FIG. 19, a universal driver (2210) includes most of the code necessary for devices in a particular class of devices (such as printers or modems) to communicate with the appropriate operating system components (such as the printing or communications subsystems). A mini-driver (2220)is the relatively small and simple driver than contains any additional instructions needed by a specific device. In many cases, however, the universal driver for a particular category of devices also includes the code needed to operate devices designed to the most common standard for that category. (For example, the Unimodem driver works with all modems supporting AT commands.)

A virtual device driver VxD) is a 32-bit, protected-mode driver that manages a system resource, such as a hardware device or installed software, so that more than one application can use the resource at the same time. VxD refers to a general virtual device driver—the x represents the type of device driver. For example, a virtual device driver for a display device is known as a VDD, a virtual device driver for a timer device is a VTD, a virtual device driver for a printer device is a VPD, and so forth.

In previous operating systems, such as Windows 3.1, VxDs were statically loaded and took up a lot of memory space. However, the operating system being described dynamically loads VxDs—that is, only those that are needed at any given time are loaded into memory. In addition, the new VxDs don't require all of their memory to be pagelocked, thereby further increasing the available memory in the system.

VxDs support all hardware devices for a typical computer, including disk controllers, serial and parallel ports, keyboard and display devices, and so on. If the state of the hardware device can be disrupted by switching between multiple applications, the device must have a corresponding virtual device for each application which ensures that the device is in the correct state whenever an application continues.

Although most virtual devices manage hardware, some manage only installed software, such as an MS-DOS device driver or a TSR program. Such virtual devices contain code to emulate the software or ensure that the software uses data that applies only to the currently running application. Also, VxDs are often used to improve software performance.

Figure 20:
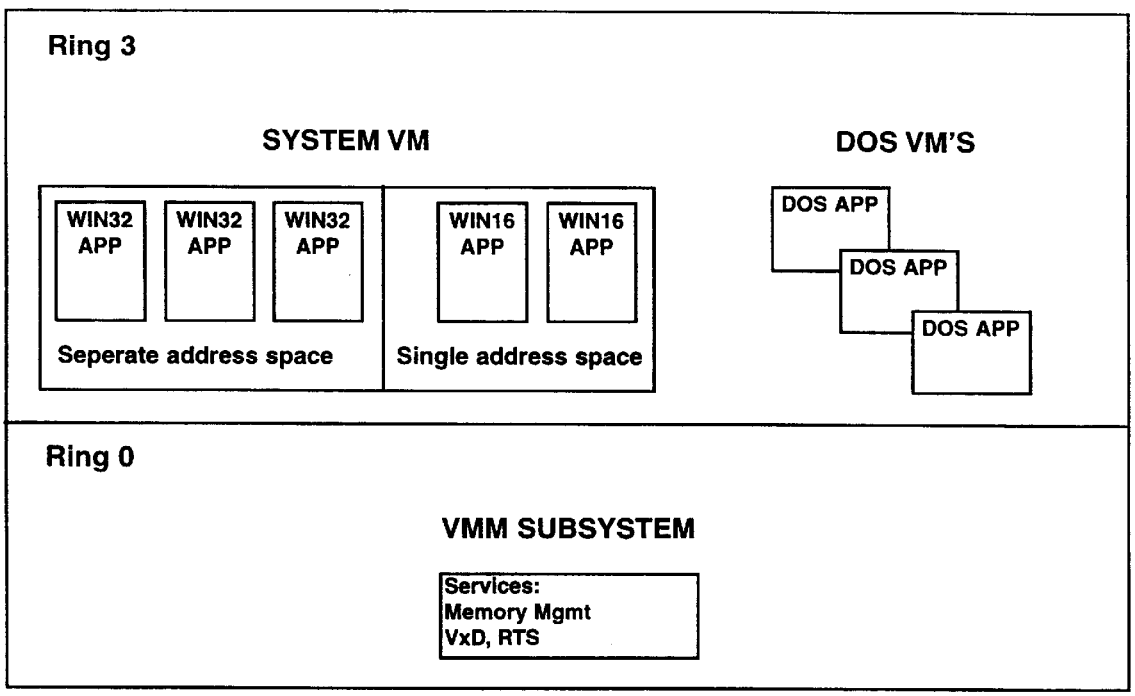
FIG. 20 is a block diagram illustrating how real time services (RTS) are implemented as a virtual device driver in accordance with the invention.

FIG. 20 is a block diagram illustrating how real time services (RTS) are implemented as a vitual device driver in accordance with the invention. As shown in FIG. 20, at the ring three level, the system virtual machine runs a plurality of 32 bit applications in a separate address space. However, 16 bit applications are run in a single address space. In addition, DOS applications run as separate virtual machines as indicated. The virtual machine manager subsystem is shown at ring zero. In addition to other functions, it manages virtual device drivers including the real time services of the invention. Real time services, being implemented as a virtual device driver, has access to certain virtual memory managers subsystem capabilities necessary to ensure CPU access to real time services when that is needed. This is explained more hereinafter.

Figure 21:
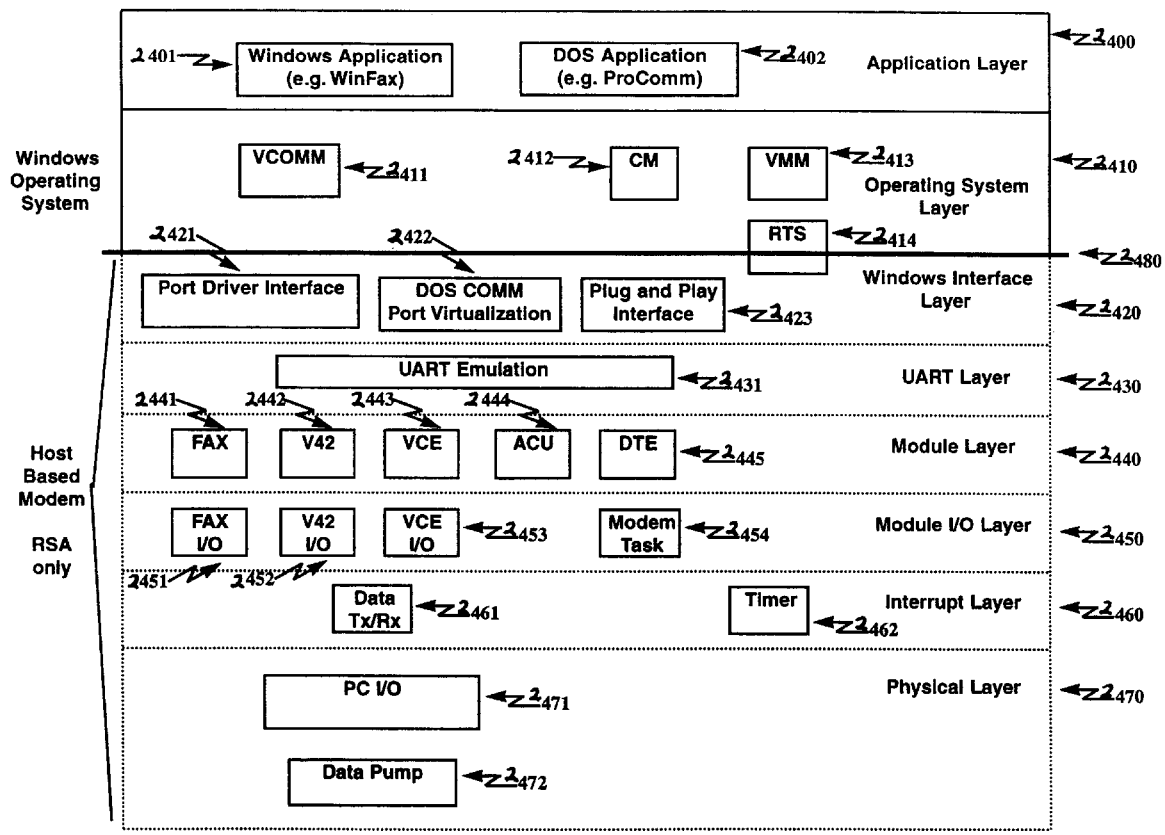
FIG. 21 is a block diagram of a host based modem using real time services in accordance with the invention to ensure adequate CPU access from modem functions.

FIG. 21 is a block diagram of a host based modem using real time services in accordance with the invention to ensure adequate CPU access for modem functions. The software architecture of the application being described is partitioned into a plurality of layers for convenience of description. At the application layer 2400, 32 bit applications such as Window application 2401 and DOS applications, such as application 2402 may be running simultaneously. In layer 2410, the virtual machine manager 2413 is illustrated together with the configuration manager 2412. These were discussed. VCOMM block 2411 is a communications device driver that provides the protected mode services that allow windows based applications and drivers to use ports and modems. To conserve system resources, communications drivers are loaded into memory only when in use by applications. Also, VCOMM uses Plug and Play services in the operating system to assist with configuration and installation of communications devices. Real time services block 2414 is shown partially within layer 2410 and partially within layer 2420. The heavy line 2480 is designed to symbolize the boundary between the operating system and the software for the host based modem of this particular example. The boundary line is not meant to represent a fixed boundary but rather to indicate that from application to application, more or less of the code may be implemented either in the operating system side or the modem side of the software stack. The fact that RTS crosses the boundary 2480 is merely indicative of the fact that RTS serves as an interface to the virtual machine manager 2413 for modem services.

As shown in FIG. 20, 16 bit applications run in a single address space. They are cooperatively scheduled, rather than preemptively scheduled. The 32 bit applications shown as operating in a single separate address space are preemptively scheduled and therefore get CPU attention when needed. However, the 16 bit applications perform scheduling using a message board. Thus, when a 16 bit application has control of the processor, it retains control until its posts a message for relinquishing control. If such an application is uncooperative, it can hog the CPU to the exclusion of other processes that need attention.

In the past, a modem has utilized a microcontroller and a data pump. It would be desirable to eliminate the micro controller and have the processing that would otherwise have been done by the microcontroller be done by the host. However, such a host based modem would need guaranteed access to the CPU in order to meet sometimes stringent requirements for events and responses. The ability of a 16 bit application to be uncooperative or of other applications to require dedicated access to the CPU in derogation of other claims creates a possibility that it would be impossible to create a host based modem unless one could guarantee access to the CPU within the required specified intervals. In accordance with the invention, the services of the VxD architecture are utilized to allow modem to get a slice of CPU time regardless of what other applications or drivers might be running.

The ACU background process or function is roughly analogous to a main routine and calls a plurality of subordinate routines sequentially. In a microcontroller environment, the ACU background loop would run continuously and be handled by the microcontroller. With the microcontroller functionality being handled by the host, in a host based modem environment, one needs to ensure that sufficient CPU access and time exist to permit modem functions to reliably occur without, for example, dropping any connections or characters.

The windows interface layer 2420 includes port driver interface 2421, DOS COMM port virtualization 2422 and plug and play interface 2423. These modules permit the applications of layer 2400 to access, through the operating system, the main code for the modem. Each of the interfaces of the windows interface layer, communicate with a universally synchronous receiver transmitter (UART) emulation module 2431. This, too, permits each of the interface modules of the interface layer to have a standard interface to the code below.

The module layer, 2440, includes a fax module 2441, a data module 2442 (V.42) a voice module (VCE) (2443) and a DTE module 2445. Modules 2441–2443 handle the data for the respective types of services. ACU, referred to above, stands for Automatic Control Unit and serves to configure the modem. ACU operates as a background process which repetitively calls all subordinate routines sequentially. If a particular module 442 has work to do, it will hold the background process while its work is completed before passing control to the next module listed in the loop. As discussed above, if the ACU module does not get activated frequently enough, characters or connections may be lost for the various services. The DTE module 2445 of layer 2440 manages moves of I/O buffer information to the respective modules. Module I/O layer 2450 contains respective interfaces for the various types of service modules 2441–2443 together with a modem task 2454. Modem task 2454 provides a standardized interface to the modules within its layer and above insulating them from the peculiarities of the data pump 2472. The interrupt layer includes a data transmit/receive module 2461 which moves characters from the data pump through the PCI/O interface 2471 to the service I/O modules 2451–2453 and then to corresponding modules 2441 and 2443. It is particularly important that the interrupt layer timely service the data pump to ensure that no characters are lost as result of buffer overflow or the like. Timer 2462 helps do that. The timer is periodically activated by RTS 2414 to ensure a sufficiently frequent heartbeat to the modem.

Figure 22:
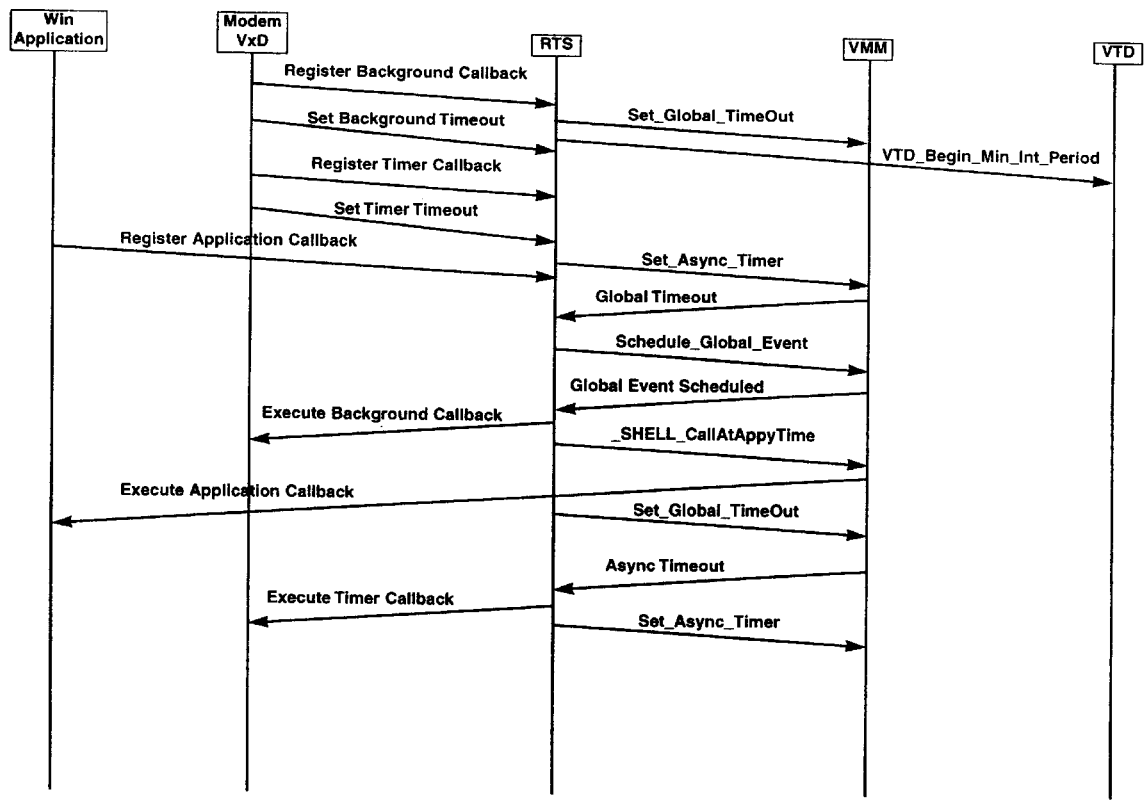
FIG. 22 is a timing representation illustrating interprocess communications between RTS and the modem VxD and operating systems services supported by the virtual machine manager and a virtual device driver for a timing device (VTD).

FIG. 22 is a timing representation illustrating interprocess communications between RTS and the modem VxD and operating system services supported by the virtual machine manager and a virtual device driver for a timing device (VTD). This particular drawing includes several services running simultaneously. To facilitate explanation of each of the types of services running, portions of this drawing will be extracted and displayed in subsequent figures.

Three principal services are being illustrated simultaneously in FIG. 22. The first is the background call back which activates the ACU in the modem in a timely fashion to ensure adequacy of modem functions. The second service is one designed to ensure a frequent heartbeat for the modem. The third service permits an application process to initiate a transfer at a time which will not interfere with other processes. These are shown respectively in FIGS. 22–25.

Figure 23:
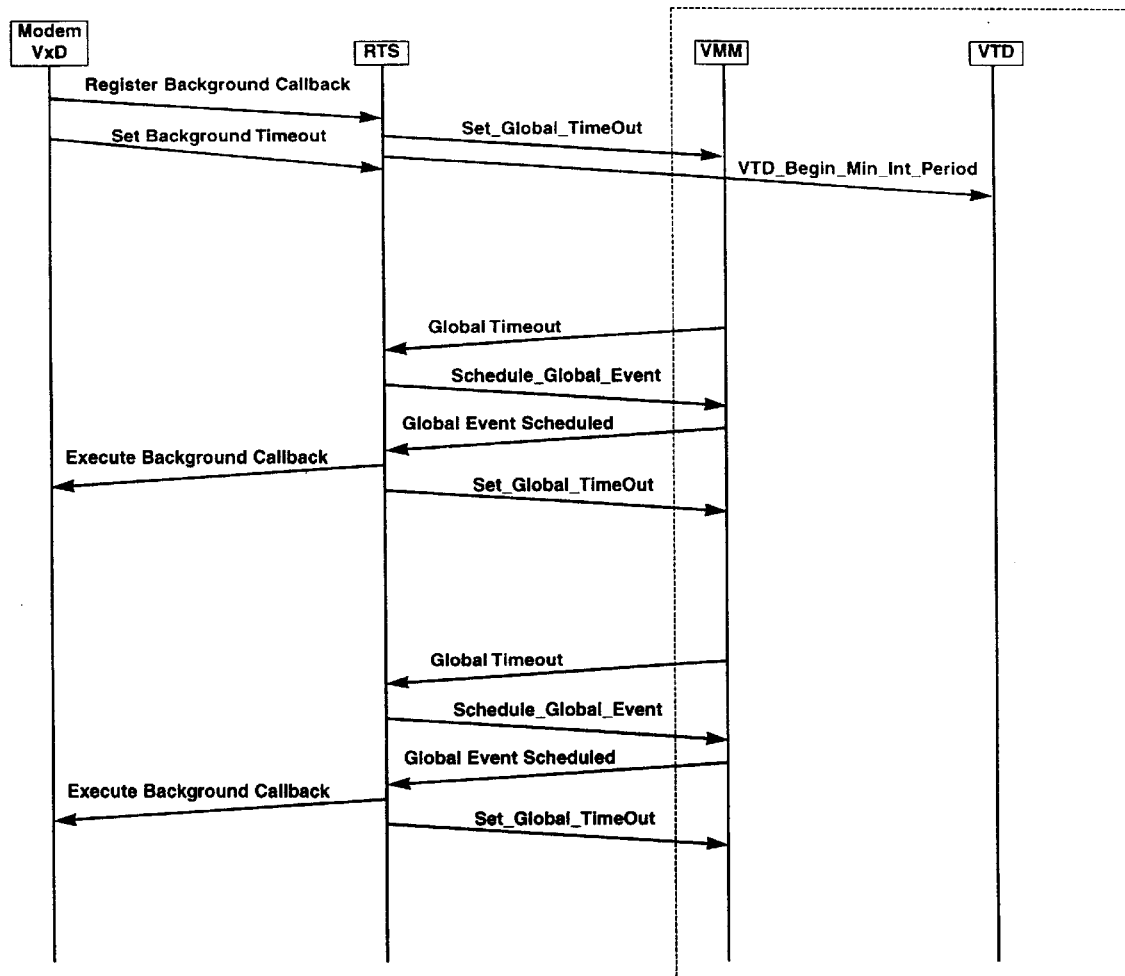
FIG. 23 is a tiling representation of interprocess communications used periodically to activate a modem's BACKGROUND function.

In FIG. 23, the process begins with a request from the modem device driver to RTS to register a background call back. In response thereto, RTS invokes the set_global timeout command to the virtual machine manager. RTS also sends a VTD_begin_min_int Period to set the granularity of the timer. Typically, the timer is set at a default of 54 milliseconds. However, it may be reduced, using this command, to as small as the granularity of a programmable interrupt timer (PIT) allows, such as an Intel 8253 timer. The modem VxD then sets a background timeout interval.

Typically, this is a hundred milliseconds or less. In response to the global timeout set previously, the global timeout occurs and the VMM module notifies RTS. RTS then sends a schedule_global_event command to the VMM and receives a global event scheduled response. When that response comes in, a background call to ACU is executed and another set_global_timeout command is sent to the VMM. The last four interchanges between the RTS and the VMM constitute a repetitive set which occur periodically, resulting in execution of the ACU background process periodically.

Figure 24:
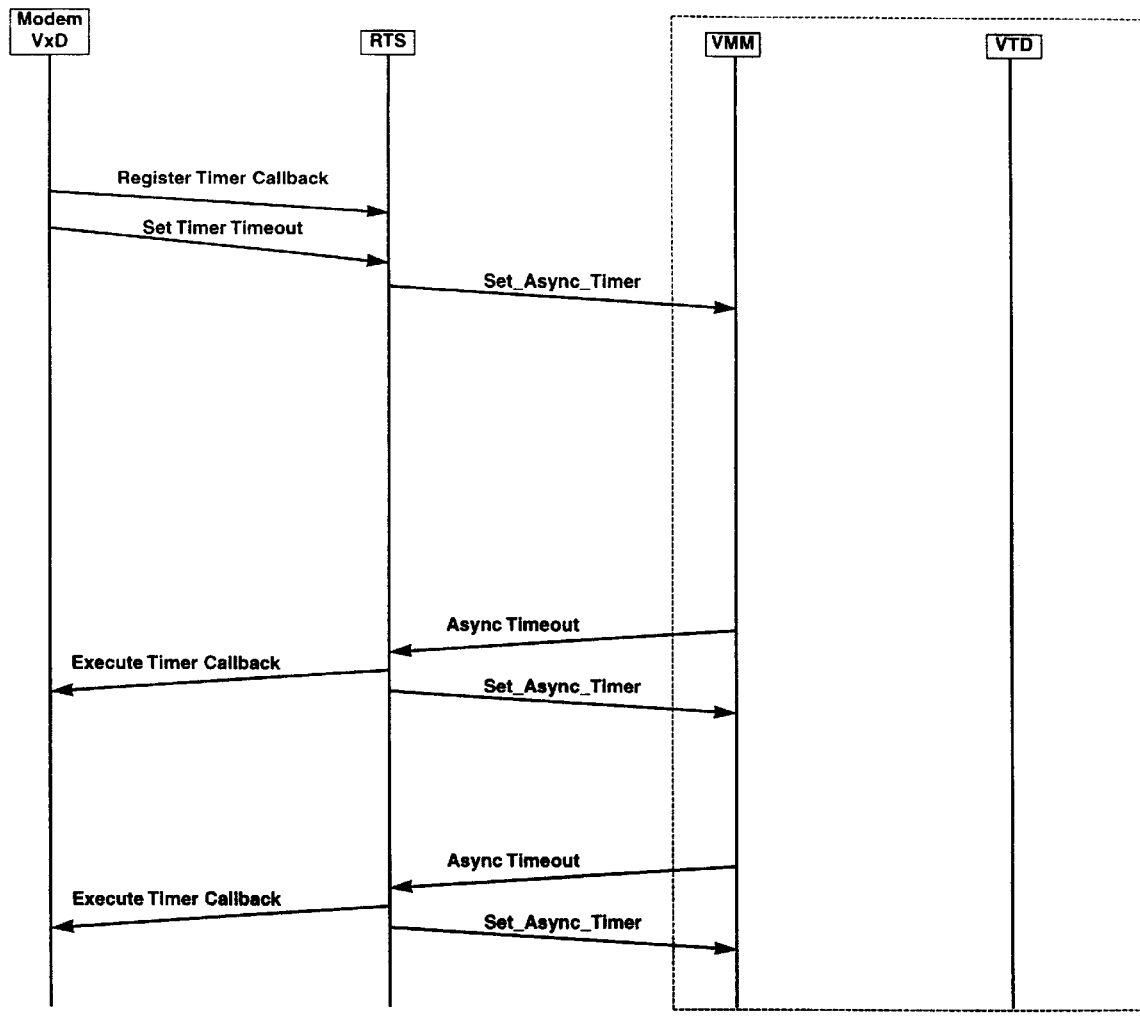
FIG. 24 is a timing representation of interprocess communications used to act as a heartbeat for the modem.

FIG. 24 is a timing representation of interprocess communications used to act as a heartbeat for the modem. The modem VxD registers a timer call back with RTS and sets the timer time out interval. In response thereto, RTS sends a set_async_timer to the VMM and, when that timer times out, RTS is notified by VMM and executes a timer call back which triggers a heartbeat or a decrement of the modem clock in the modem code. After the timer call back is executed, RTS again sends a set_async_timer command to the VMM. The process of setting an asynchronous timer, having the timer time out and executing a timer call back as a heartbeat are repeated periodically to ensure an adequate heartbeat for the modem.

Figure 25:
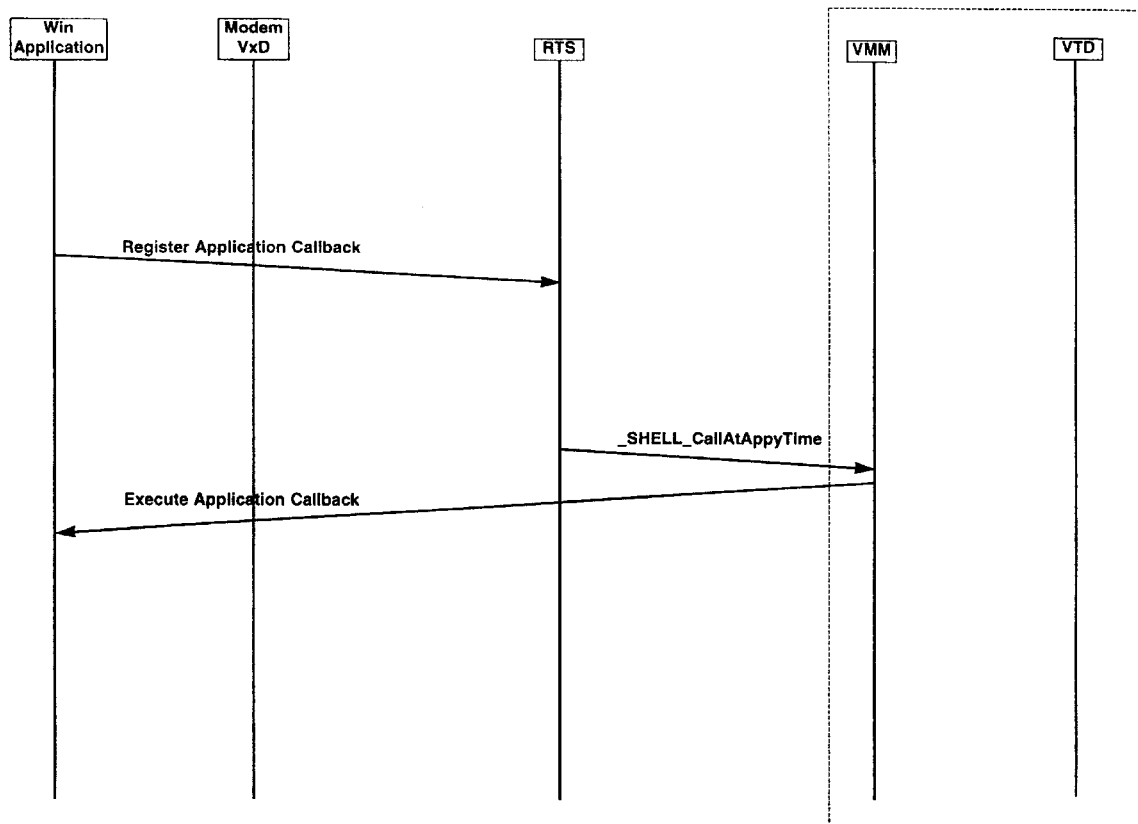
FIG. 25 is a timing representation of inter process communication used to permit an application to initiate a transfer at a time which will not interfere with other processes.

FIG. 25 is a timing representation of interprocess communication used to permit an application in layer 400 to initiate a transfer at a time which will not interfere with other processes. In certain initialization sequences, a windows application may request information about the "personality" of a modem. Such a call would be routed to RTS which would then invoke a _SHELL_CallAt_AppyTime. When the VMM detects that the personality exchange between the modem and the application can occur without damaging ongoing I/O or other processes, an application call back will be executed to the application and the exchange will occur.

Thus, by using real time services, and the services of the virtual machine manager, a host based modem or other process or device can be implemented which is guaranteed to receive an adequate share of CPU attention regardless of the other applications or drivers running simultaneously. By implementing this real time service as a virtual device driver, one has access to the services of the virtual machine manager in a way which permits fair and equal competition for CPU time regardless of the problems that would otherwise occur in the prior art.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Computer apparatus for providing communications comprising:
   a. a computer having a bus;
   b. a DOS application process running on said computer;
   c. a hardware communications port connected to said bus; and
   d. at least one virtual device driver running on said computer and controlling communications from said DOS application over said hardware port, said virtual device driver emulating UART to UART communications and providing modem functionality using said computer and a controllerless modem: and
   e. a virtual device driver providing guaranteed computer access to said controllerless modem, regardless of the state of the DOS application.

2. The computer apparatus of claim 1, further comprising at least one 32-bit application process; a communications interface process running on said computer; in which said controllerless modem is a virtual device driver controlling communications from said 32-bit application over said hardware port.

3. The computer apparatus of claim 2 in which said at least one virtual device driver comprises a virtual communications device interface and a virtual programmable interrupt handler.

4. The computer apparatus of claim 3 in which said at least one virtual device driver controls communications from said DOS application using said communications device interface.

5. The computer apparatus of claim 4 in which said at least one virtual device driver allocates registers of a register set corresponding at least in part to registers used in UART to UART communications.

6. A computer system comprising:
   a. a network;
   b. a plurality of computers connected to said network;
   c. at least one of said computers comprising a main bus and at least one virtual device driver running on said computer and controlling communications from a DOS application running on said computer over a hardware port, using a controllerless modem servicing both DOS and non-DOS applications, said virtual device driver emulating UART to UART communications for said DOS applications using a processor controlling said main bus; and further comprising:
   d. a virtual device driver providing guaranteed computer access to said controllerless modem, regardless of the state of the DOS application.

7. A method of providing communications to and from a DOS application over a communications port of a computer having a main bus, comprising the steps of:
   a. providing a virtual device driver emulating UART to UART communications to a DOS application;
   b. providing a controllerless modem process for receiving communications from non-DOS applications and from said virtual device driver using a processor controlling said main bus; wherein the virtual device driver is guaranteed computer access to said controllerless modem, regardless of the state of the DOS application; and
   c. directing communications from said DOS application to said controllerless modem over said virtual device driver.

8. The method of claim 7 further comprising the step of directing communications from at least one 32-bit application to said controllerless modem process.

9. The method of claim 8 further comprising the step of arbitrating demands for usage of said controllerless modem by 32-bit applications and a DOS application.

10. The method of claim 7 in which the step of providing a virtual device driver includes allocating registers of a register set corresponding at least in part to registers used in UART to UART communications.

11. A method of providing communications over a network having a plurality of computers connected thereto, comprising the steps of:
   providing at least one computer connected to said network having a main bus; and
   providing at least one virtual device driver running on said at least one computer, said computer controlling communications from a DOS application running on said computer over a hardware port using a controllerless modem servicing both DOS and non-DOS applications, said virtual device driver emulating UART to UART communications and providing modem functionality to said DOS application using a processor controlling said main bus and said virtual device driver is guaranteed computer access to said controllerless modem, regardless of the state of the DOS application.

12. A method of providing communications to and from a DOS application over a communications port of a computer having a main bus, comprising the steps of:
 a. loading a virtual device driver emulating UART to UART communication as a static virtual device driver;
 b. reading a system registry to determine which com port and IRQ are to be emulated;
 c. writing an address of a first register of a com port to be emulated to a basis input output system (BIOS) com port address table starting at address 400h.

13. A computer program product, comprising:
 a. a memory medium; and
 b. a computer program, stored on said memory medium, said computer program comprising instructions implementing a virtual device driver emulating UART to UART communications and providing access by one or more DOS applications to a controllerless modem servicing both DOS and non-DOS applications, and instructions for implementing a virtual device driver to guarantee computer access to said controllerless modem, regardless of the state of the one or more DOS applications.

14. The computer program product for controlling a computer of claim 13 in which said computer program is transmitted from said memory medium over a network interface.

15. A computer program product for controlling a computer, comprising:
 a. a memory medium; and
 b. a computer program, stored on said memory medium, said computer program comprising instructions for implementing at least one virtual device driver for controlling network communications from a DOS application using a controllerless modem servicing both DOS and non-DOS applications, wherein the at least one virtual device driver is guaranteed computer access to said controllerless modem, regardless of the state of the DOS application.

16. The computer program product of claim 15 in which said computer program is transmitted from said memory medium over a network interface.

17. A computer program product, comprising:
 a. a memory medium; and
 b. a computer program, stored on said memory medium, said computer program comprising instructions for loading a virtual device driver emulating UART to UART communication as a static virtual device driver, reading a system registry to determine which com port and IRQ are to be emulated, and writing an address of a first register of a com port to be emulated to a basic input output system (BIOS) com port address table starting at address 400h.

18. Computer apparatus for providing communications comprising:
 a. a computer having a bus;
 b. a first virtual device driver providing an interface to a controllerless modem, the controllerless modem implementing a virtual UART;
 c. a DOS application process running on said computer;
 d. a hardware communications port connected to said bus for receiving data from and sending data to said controllerless modem; and
 e. at least on virtual device driver running on said computer and controlling communications from said DOS application over said hardware port using the services of said controllerless modem, said virtual device driver emulating a UART to said DOS application, wherein the virtual device driver is guaranteed computer access to said controllerless modem, regardless of the state of the DOS application.

* * * * *